US011824220B2

(12) United States Patent
Ryu et al.

(10) Patent No.: US 11,824,220 B2
(45) Date of Patent: Nov. 21, 2023

(54) ELECTRONIC DEVICE HAVING A VENTED BATTERY BARRIER

(71) Applicant: Apple Inc., Cupertino, CA (US)

(72) Inventors: Kee Suk Ryu, Cupertino, CA (US); Andrew J. Hall, Cupertino, CA (US); Jingyi Li, Cupertino, CA (US); Ki Myung Lee, Cupertino, CA (US); Sung Chang Lee, Saratoga, CA (US); Wei Guang Wu, Palo Alto, CA (US); Thomas A. Boehler, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 324 days.

(21) Appl. No.: 17/011,290

(22) Filed: Sep. 3, 2020

(65) Prior Publication Data

US 2022/0069269 A1 Mar. 3, 2022

(51) Int. Cl.
 *H01M 50/30* (2021.01)
 *H01M 50/317* (2021.01)
 (Continued)

(52) U.S. Cl.
 CPC ........ *H01M 50/317* (2021.01); *G06F 1/1626* (2013.01); *G06F 1/1635* (2013.01);
 (Continued)

(58) Field of Classification Search
 CPC .. H01M 50/11; H01M 50/124; H01M 50/126; H01M 50/30; H01M 50/317;
 (Continued)

(56) References Cited

U.S. PATENT DOCUMENTS

| 3,655,455 A | 4/1972 | Jones |
| 4,369,225 A | 1/1983 | Manabe et al. |

(Continued)

FOREIGN PATENT DOCUMENTS

| CN | 1144017 | 2/1997 |
| CN | 1262790 | 8/2000 |

(Continued)

OTHER PUBLICATIONS

Author Unknown, "Lithium ion cells—Material Safety Data Sheet," Hitachi Maxwell Energy, Ltd., pp. 1-4, 2021.

(Continued)

*Primary Examiner* — Adrian S Wilson
*Assistant Examiner* — Gage Crum
(74) *Attorney, Agent, or Firm* — Brownstein Hyatt Farber Schreck, LLP

(57) ABSTRACT

A portable electronic device may include a housing, a display at least partially within the housing, a transparent cover over the display, and a battery at least partially within the housing. The battery may include a battery cell, a pouch encasing the battery cell, and a gas release relief system including a gas-permeable membrane configured to prevent liquid from escaping the pouch and a valve configured to selectively release gas from the pouch. The device may also include a processing system configured to, in a first mode of operation, cause the valve to open to allow gas to be released from the pouch, and, in a second mode of operation, cause the valve to close.

20 Claims, 13 Drawing Sheets

(51) Int. Cl.
*H01M 10/48* (2006.01)
*G06F 1/16* (2006.01)
*H01M 50/209* (2021.01)
*H01M 50/325* (2021.01)

(52) U.S. Cl.
CPC ......... *H01M 10/48* (2013.01); *H01M 50/209* (2021.01); *H01M 50/325* (2021.01); *H01M 50/394* (2021.01); *H01M 2220/30* (2013.01)

(58) Field of Classification Search
CPC .. H01M 50/325; H01M 50/333; H01M 10/48; H01M 50/178; H01M 10/4257; H01M 2220/30; G06F 1/16; G06F 1/1626; G06F 1/1635; G01L 1/16; G01L 1/18
See application file for complete search history.

(56) References Cited

U.S. PATENT DOCUMENTS

| | | | |
|---|---|---|---|
| 5,134,046 A | 7/1992 | Chow et al. | |
| 5,523,179 A | 6/1996 | Chu | |
| 5,554,459 A | 9/1996 | Gozdz et al. | |
| 5,561,004 A | 10/1996 | Bates et al. | |
| 6,001,138 A | 12/1999 | Dix | |
| 6,074,775 A * | 6/2000 | Gartstein | H01M 50/30 |
| | | | 429/61 |
| 6,180,278 B1 | 1/2001 | Prickett | |
| 6,200,634 B1 | 3/2001 | Johnsgard et al. | |
| 6,319,631 B1 | 11/2001 | Bay et al. | |
| 6,410,189 B1 | 6/2002 | Yamada et al. | |
| 6,610,572 B1 | 8/2003 | Takei et al. | |
| 6,632,563 B1 | 10/2003 | Krasnov et al. | |
| 6,713,987 B2 | 3/2004 | Krasnov et al. | |
| 6,893,772 B2 | 5/2005 | Howard | |
| 7,285,334 B1 | 10/2007 | Yamashita et al. | |
| 7,297,441 B2 | 11/2007 | Hatta et al. | |
| 7,585,582 B2 | 9/2009 | Chen | |
| 7,801,613 B2 | 9/2010 | Li et al. | |
| 7,811,702 B2 | 10/2010 | Laurent et al. | |
| 7,927,744 B2 | 4/2011 | Mizutani et al. | |
| 7,931,989 B2 | 4/2011 | Klaassen | |
| 7,935,439 B2 | 5/2011 | Kim | |
| 7,939,195 B2 | 5/2011 | Salot et al. | |
| 7,959,769 B2 | 6/2011 | Zhang et al. | |
| 7,960,054 B2 | 6/2011 | Zhang et al. | |
| 8,044,813 B1 | 10/2011 | Dembo | |
| 8,153,301 B2 | 4/2012 | Jiang | |
| 8,168,322 B2 | 5/2012 | Krasnov et al. | |
| 8,263,256 B2 | 9/2012 | Hatta et al. | |
| 8,293,402 B2 | 10/2012 | Lee et al. | |
| 8,323,828 B2 | 12/2012 | Yamazaki et al. | |
| 8,420,252 B2 | 4/2013 | Shakespeare et al. | |
| 8,431,264 B2 | 4/2013 | Neudecker et al. | |
| 8,435,312 B2 | 5/2013 | Chen | |
| 8,435,603 B2 | 5/2013 | Bentley et al. | |
| 8,445,130 B2 | 5/2013 | Neudecker et al. | |
| 8,475,955 B2 | 7/2013 | Krasnov et al. | |
| 8,518,581 B2 | 8/2013 | Neudecker et al. | |
| 8,518,583 B2 | 8/2013 | Mizuno et al. | |
| 8,580,332 B2 | 11/2013 | Kwak et al. | |
| 8,669,345 B2 | 3/2014 | Lee et al. | |
| 8,679,674 B2 | 3/2014 | Liang et al. | |
| 8,687,336 B2 | 4/2014 | Wang | |
| 8,691,447 B2 | 4/2014 | Pitts et al. | |
| 8,822,059 B2 | 9/2014 | Wang | |
| 8,822,069 B2 | 9/2014 | Baek et al. | |
| 8,956,761 B2 | 2/2015 | Reynolds et al. | |
| 8,993,172 B2 | 3/2015 | Upadhyaya | |
| 9,083,048 B2 | 7/2015 | Wang et al. | |
| 9,088,050 B2 | 7/2015 | Ueda | |
| 9,153,386 B2 * | 10/2015 | Okada | H01M 50/394 |
| 9,209,451 B2 | 12/2015 | Fukushima | |
| 9,209,497 B2 | 12/2015 | Elian et al. | |
| 9,397,325 B2 * | 7/2016 | Kinuta | H01M 50/3425 |
| 9,525,177 B2 | 12/2016 | Sturgeon et al. | |
| 9,570,775 B2 | 2/2017 | Huang et al. | |
| 9,601,751 B2 | 3/2017 | Huang et al. | |
| 9,673,481 B2 | 6/2017 | Sabi et al. | |
| 9,711,770 B2 | 7/2017 | Anastas et al. | |
| 9,768,450 B2 | 9/2017 | Song et al. | |
| 9,887,403 B2 | 2/2018 | Huang et al. | |
| 9,899,661 B2 | 2/2018 | Huang et al. | |
| 9,911,947 B2 | 3/2018 | Hong | |
| 9,941,507 B2 | 4/2018 | Pirk et al. | |
| 10,033,029 B2 | 7/2018 | Anastas et al. | |
| 10,141,600 B2 | 11/2018 | Huang et al. | |
| 10,211,433 B2 | 2/2019 | Anastas et al. | |
| 10,439,187 B2 | 10/2019 | Anastas et al. | |
| 10,581,044 B2 * | 3/2020 | Lee | H01M 50/557 |
| 10,629,947 B2 | 4/2020 | Affinito et al. | |
| 11,374,264 B2 * | 6/2022 | Fukuoka | H01M 10/48 |
| 2001/0032666 A1 | 10/2001 | Jenson et al. | |
| 2002/0110733 A1 | 8/2002 | Johnson | |
| 2002/0127362 A1 | 9/2002 | Jansen et al. | |
| 2003/0129379 A1 | 7/2003 | Yao et al. | |
| 2003/0180621 A1 | 9/2003 | Matsumoto | |
| 2003/0232248 A1 | 12/2003 | Iwamoto | |
| 2005/0079418 A1 | 4/2005 | Kelley et al. | |
| 2005/0084754 A1 * | 4/2005 | Klein | H01M 10/34 |
| | | | 429/61 |
| 2005/0211313 A1 | 9/2005 | Sherman et al. | |
| 2005/0250010 A1 | 11/2005 | Kurihara et al. | |
| 2006/0093896 A1 * | 5/2006 | Hong | H01M 10/42 |
| | | | 429/61 |
| 2006/0210880 A1 | 9/2006 | Howard et al. | |
| 2008/0032236 A1 | 2/2008 | Wallace | |
| 2009/0081542 A1 * | 3/2009 | Yageta | H01G 9/08 |
| | | | 429/185 |
| 2009/0193649 A1 | 8/2009 | Niessen et al. | |
| 2009/0208754 A1 | 8/2009 | Chu et al. | |
| 2009/0317708 A1 | 12/2009 | Brandl et al. | |
| 2010/0035152 A1 | 2/2010 | Sastry et al. | |
| 2010/0066683 A1 | 3/2010 | Chang et al. | |
| 2011/0123844 A1 | 5/2011 | Bhardwaj et al. | |
| 2011/0183183 A1 | 7/2011 | Grady et al. | |
| 2011/0195271 A1 | 8/2011 | Zadesky et al. | |
| 2011/0200868 A1 | 8/2011 | Klaassen | |
| 2012/0028089 A1 * | 2/2012 | Mustakallio | H01M 50/24 |
| | | | 29/623.2 |
| 2012/0088151 A1 | 4/2012 | Yamazaki et al. | |
| 2012/0107650 A1 * | 5/2012 | Kritzer | H01G 11/78 |
| | | | 137/527 |
| 2012/0135288 A1 | 5/2012 | Meintschel | |
| 2013/0029205 A1 | 1/2013 | Adams | |
| 2013/0217444 A1 * | 8/2013 | Lee | G06F 1/1626 |
| | | | 455/566 |
| 2014/0007418 A1 | 1/2014 | Song | |
| 2014/0011067 A1 | 1/2014 | Baba et al. | |
| 2014/0264915 A1 | 9/2014 | Huang et al. | |
| 2014/0272561 A1 | 9/2014 | Huang et al. | |
| 2015/0132621 A1 * | 5/2015 | Henrici | H01M 50/569 |
| | | | 429/90 |
| 2016/0036025 A1 * | 2/2016 | Hofer | H01M 50/342 |
| | | | 429/56 |
| 2016/0064719 A1 | 3/2016 | Bushnell et al. | |
| 2016/0064780 A1 * | 3/2016 | Jarvis | H01M 10/48 |
| | | | 429/61 |
| 2016/0093837 A1 | 3/2016 | Bushnell et al. | |
| 2017/0309975 A1 * | 10/2017 | Iwamoto | H01M 10/52 |
| 2018/0309155 A1 | 10/2018 | Huang et al. | |
| 2019/0165430 A1 | 5/2019 | Maresh | H01M 10/4257 |
| 2020/0194848 A1 * | 6/2020 | Honda | H01M 50/30 |
| 2022/0006155 A1 * | 1/2022 | Sasaki | H01M 50/105 |
| 2022/0146248 A1 * | 5/2022 | Hurwitz | G01L 1/142 |

FOREIGN PATENT DOCUMENTS

| | | |
|---|---|---|
| CN | 101640968 | 2/2010 |
| CN | 101676845 | 3/2010 |
| CN | 103094512 | 5/2013 |
| EP | 0792741 | 9/1997 |
| EP | 0975031 | 1/2000 |

(56) References Cited

FOREIGN PATENT DOCUMENTS

| EP | 1804315 | 7/2007 | | |
|----|---------|--------|----|----|
| EP | 2105983 | 9/2009 | | |
| EP | 2481499 | 8/2012 | | |
| JP | S61032951 | 2/1986 | | |
| JP | S63314770 | 12/1988 | | |
| JP | 2013004173 | 1/2013 | | |
| JP | 2013021347 | 1/2013 | | |
| KR | 20190042215 A | * | 4/2019 | ............. H01M 2/12 |
| KR | 20210075476 A | * | 6/2021 | ............ H01M 50/10 |
| TW | I306319 | 2/2009 | | |
| TW | 201010094 | 3/2010 | | |
| TW | 201014020 | 4/2010 | | |
| TW | 201108441 | 3/2011 | | |
| TW | 201218494 | 5/2012 | | |
| WO | WO2008/007867 | 1/2008 | | |
| WO | WO2010/033609 | 3/2010 | | |
| WO | WO2012/086557 | 6/2012 | | |
| WO | WO2012/090929 | 7/2012 | | |
| WO | WO2012/114162 | 8/2012 | | |
| WO | WO2013/031195 | 3/2013 | | |
| WO | WO2018/108713 | 6/2018 | | |
| WO | WO2019/163550 | 8/2019 | | |

OTHER PUBLICATIONS

Author Unknown, "Polyetheretherketone (PEEK): A Complete Guide on High-Heat Engineering Plastic," Omnexus, pp. 1-8, 2021.

Zhonghua et al., "Layered Cathode Materials Li [$Ni_xLi_{(1/3-2x/3)}Mn_{(2/3-x/d)}$]$O_2$ for Lithium-Ion Batteries," Electrochemical and Solid-State Letters, vol. 4, No. 11, pp. A191-A194, 2001.

* cited by examiner

ELECTRONIC DEVICE HAVING A VENTED BATTERY BARRIER

FIELD

The subject matter of this disclosure relates generally to electronic devices, and more particularly, to batteries for electronic devices.

BACKGROUND

Modern consumer electronic devices use batteries to provide electrical power for the electronic components and circuitry of the devices. In many cases, rechargeable batteries are used so that users do not need to replace the batteries each time the batteries are discharged.

SUMMARY

A portable electronic device may include a housing, a display at least partially within the housing, a transparent cover over the display, and a battery at least partially within the housing. The battery may include a battery cell, a pouch encasing the battery cell, and a gas release relief system including a gas-permeable membrane configured to prevent liquid from escaping the pouch and a valve configured to selectively release gas from the pouch. The device may also include a processing system configured to, in a first mode of operation, cause the valve to open to allow gas to be released from the pouch, and, in a second mode of operation, cause the valve to close.

The portable electronic device may further include a sensing system configured to detect a gas condition within the pouch, the processing system may be configured to cause the valve to open in response to the gas condition satisfying a criteria, and the processing system may be configured to cause the valve to close in response to the gas condition failing to satisfy a criteria. The sensing system may include a resistive sensor attached to the pouch.

The portable electronic device may further include a mesh screen positioned over the gas-permeable membrane. The pouch may include a wall defined by a laminate, the laminate including a first polymer layer defining an interior surface of the pouch, a metallic layer over the first polymer layer, an adhesive layer over the metallic layer, and a second polymer layer over the adhesive layer and defining an exterior surface of the pouch. The pouch may define a hole extending through the first polymer layer, the metallic layer, the adhesive layer, and the second polymer layer, and a peripheral portion of the gas-permeable membrane may be positioned between two layers of the laminate. The valve may be coupled to a flexible circuit substrate, and the flexible circuit substrate may be positioned between the metallic layer and the second polymer layer of the pouch.

A portable electronic device may include a housing, a display at least partially within the housing, a transparent cover over the display, and a battery at least partially within the housing. The battery may include a battery enclosure, a battery cell within the battery enclosure, and a valve coupled to the battery enclosure and configured to selectively release gas from the battery enclosure. The portable electronic device may further include a sensing system configured to detect a gas condition within the battery enclosure and a processing system configured to selectively actuate the valve to release the gas from the battery enclosure based at least in part on the detected gas condition.

The battery enclosure may define a hole extending through a wall of the battery enclosure, the battery may further include a porous membrane extending across the hole, and the valve may be positioned over the hole. The battery enclosure may include a pouch defining an interior volume, and the pouch may include a first polymer layer defining an interior surface of the pouch, a metallic layer over the first polymer layer, and a second polymer layer over the metallic layer and defining an exterior surface of the pouch. The second polymer layer may define a first hole, the metallic layer may define a second hole aligned with the first hole, and the first polymer layer may define a porous region aligned with the first hole and the second hole. The porous region of the first polymer layer may be gas-permeable and waterproof.

The sensing system may be configured to detect a dimensional transformation of the pouch. The sensing system may include a piezoelectric element coupled to the battery enclosure.

A battery for a portable electronic device may include a battery cell, a pouch formed of a flexible laminate and encasing the battery cell and defining a hole, a sensing component configured to detect a gas condition within the pouch, a gas-permeable waterproof membrane extending across the hole in the pouch, and a valve covering the hole and configured to be transitioned between an open position and a closed position based on the gas condition within the pouch. The valve may be an electromechanical valve, the flexible laminate may include a flexible circuit substrate, and the electromechanical valve may be coupled to the flexible circuit substrate. The gas condition may correspond to a predetermined dimensional transformation of the pouch. The sensing component may include a transducer positioned in an interior volume of the pouch. The battery may further include a pump configured to assist in the release of gas from within the pouch. The valve may be biased in the closed position, and the valve may be configured to be opened in response to receiving a signal from a device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
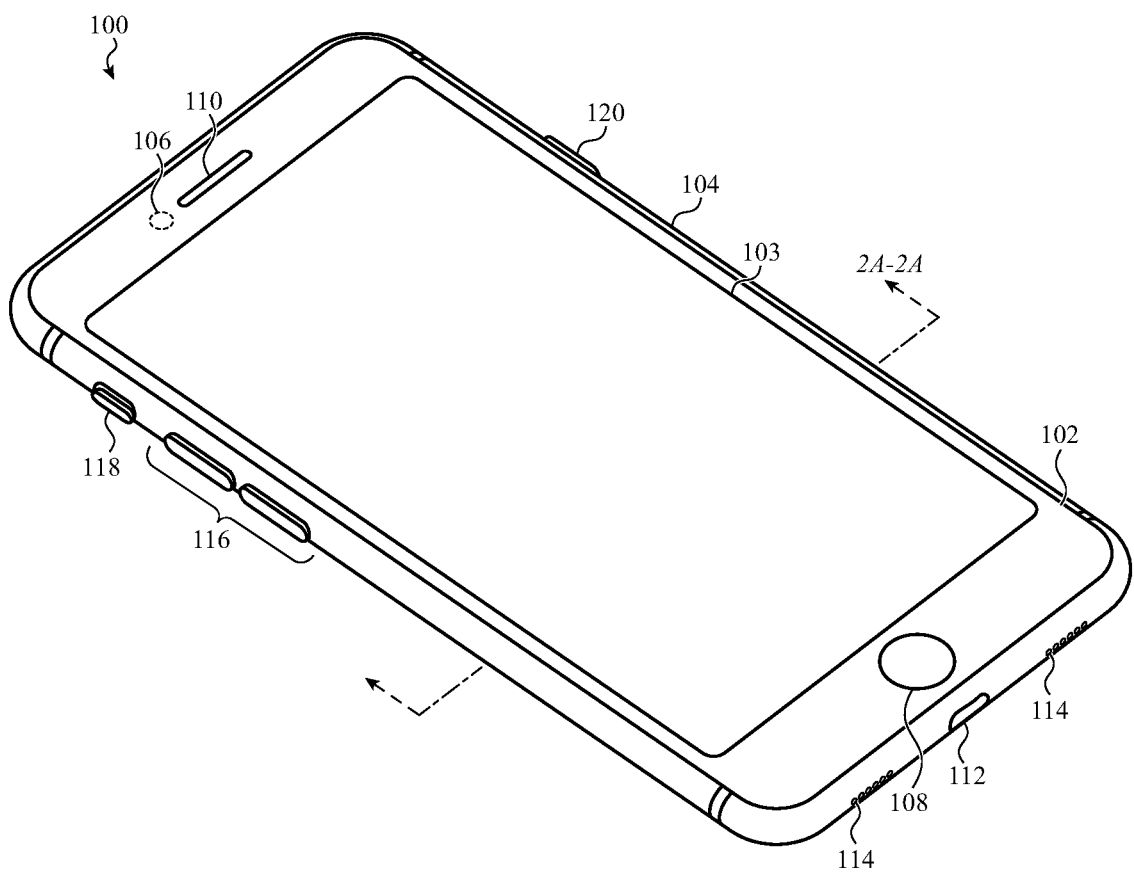
FIGS. 1A-1B depict an example electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Modern electronic devices may include rechargeable batteries to provide the electrical power needed to operate the devices. For example, mobile phones (e.g., smartphones), laptop computers, tablet computers, smartwatches, and the like, may include rechargeable batteries that allow the devices to be used untethered (e.g., without a wired connection to an external power source). Such rechargeable batteries may use various kinds of electrochemistries, such as lithium-ion, sodium-ion, nickel-cadmium, nickel-metal hydride, or the like. Further, rechargeable batteries may take various different form factors and/or have different types of battery cell structures. Example cell structures include, for example, a jellyroll cell structure, a stacked cell structure, or the like.

A rechargeable battery may include an enclosure, and a battery cell that is encased in the enclosure. In some cases, the battery cell may include electrodes (e.g., an anode and a cathode), and an electrolyte. For example, in the case of a lithium-ion battery, the battery cell may include a lithium-containing cathode, a graphite anode, and a liquid- or polymer-based electrode (which may include lithium salts in a liquid or polymer gel carrier). The enclosure may be any suitable enclosure, such as a rigid enclosure (e.g., a metal box or tube) or a flexible polymer laminate pouch. A pouch enclosure may be formed from a sheet that is folded onto itself to form an interior void space in which the battery cell is contained. The sheet, and thus the pouch formed from the sheet, may be a flexible laminate in which several different materials are laminated together including one or more barriers to prevent ingress of oxygen or other gasses and to contain the electrolyte and other internal materials. The pouch (or other enclosure) may be evacuated to reduce or eliminate air and/or other gasses inside the enclosure.

In some cases, gasses in the battery may remain contained within the enclosure. In the case of flexible enclosures such as laminate pouches, these gasses may cause the pouch to undergo dynamic dimensional transformations. In tightly-packed electronic devices, it may be beneficial to reduce the amount of extra space reserved for such dimensional transformations.

Described herein are batteries that include gas release systems that facilitate the release of gasses from within a battery enclosure (e.g., a pouch), while also preventing the electrolyte in the battery from escaping and preventing or limiting air, liquids, or other contaminants from entering the battery enclosure. The systems and techniques described herein may be used to reduce dynamic dimensional transformations of the battery due to the presence of gasses. Such structures may include components such as valves that can be selectively actuated to open and/or close based on the presence of gas or other gas condition in the enclosure, as well as gas-permeable waterproof membranes that allow gasses to pass out of the enclosure while keeping the electrolyte inside the enclosure. Further, the batteries (and/or the devices in which the batteries are included) may include sensor systems that can detect the presence of gas or other gas condition in the enclosure, and selectively actuate (e.g., open or close) the valves at appropriate times to release the gasses from the enclosures. These and other details and features are described herein.

FIG. 1A shows an example electronic device 100 embodied as a mobile phone (e.g., an example of a portable electronic device). While the device 100 is a mobile phone, the concepts presented herein may apply to any appropriate electronic device, including wearable devices (e.g., watches), laptop computers, handheld gaming devices, or any other device that incorporates a battery (e.g., a lithium-ion battery). Accordingly, any reference to an "electronic device" encompasses any and all of the foregoing.

The electronic device 100 includes a cover 102 (e.g., a front cover), such as a glass, plastic, or other substantially transparent material, component, or assembly, attached to a housing 104. The cover 102, which may be referred to as a transparent cover 102, may be positioned over a display 103. The cover 102 may be formed from glass (e.g., a chemically strengthened glass), sapphire, ceramic, glass-ceramic, plastic, or another suitable material. The housing 104 may include one or more metal members coupled together with polymer (or other dielectric) materials. In some cases, the housing 104 is a single piece of metal, a single piece of polymer, or it may use other materials and/or constructions.

The display 103 may be at least partially positioned within the interior volume of the housing 104. The display 103 may be coupled to the transparent cover 102, such as via an adhesive or other coupling scheme. In some cases, the assembly that includes the display 103 and the transparent cover 102 may be referred to as a top module. The top module may also include other components, such as touch- and/or force-sensing components, structural members, cameras, biometric sensors, ambient light sensors, or the like.

The display 103, which may also be referred to herein as a display stack, may include a liquid-crystal display (LCD), light-emitting diode, organic light-emitting diode (OLED) display, an active layer organic light emitting diode (AMO-LED) display, organic electroluminescent (EL) display, electrophoretic ink display, or the like. The display 103 may be configured to display graphical outputs, such as graphical user interfaces, that the user may view and interact with. The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor).

The display 103 may include or be associated with one or more touch- and/or force-sensing systems. In some cases, components of the touch- and/or force-sensing systems are integrated with the display stack. For example, electrode layers of a touch- and/or force-sensor may be provided in a stack that includes display components (and is optionally attached to or at least viewable through the cover 102).

The touch- and/or force-sensing systems may use any suitable type of sensing technology, including capacitive sensors, resistive sensors, surface acoustic wave sensors, piezoelectric sensors, resistive sensors, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system.

The device 100 may also include a front-facing camera 106. The front-facing camera 106 may be positioned below or otherwise covered and/or protected by the cover 102.

The device 100 may also include a button 108 with which a user may interact to control aspects of the device 100. The button 108 may also include a fingerprint sensor (or include components of a fingerprint sensor). The fingerprint sensor may be configured to capture an image or other representative data of a finger that is in contact with the button 108. The device may verify that a user is an authorized user by comparing a captured image (or other representative data) of a finger that is in contact with the button 108 with stored images (or other representative data) of authorized users.

The device 100 may also include other buttons (e.g., buttons 116, 120), switches (e.g., switch 118), and/or other physical input systems. Such input systems may be used to control power states (e.g., the button 120), change speaker volume (e.g., buttons 116), switch between "ring" and "silent" modes, and the like (e.g., the switch 118).

The device 100 may also include a speaker outlet 110 to provide audio output to a user, such as to a user's ear during voice calls. The device 100 may also include a charging port 112 (e.g., for receiving a power cable for providing power to the device 100 and charging the battery of the device 100). The device 100 may also include loudspeaker openings 114. The loudspeaker openings 114 may allow sound output from an internal speaker system (e.g., the speaker system 216, FIG. 2) to exit the housing 104. The device 100 may also include one or more microphones. In some cases, a microphone within the housing 104 may be acoustically coupled to the surrounding environment through a loudspeaker opening 114.

Figure 1B:
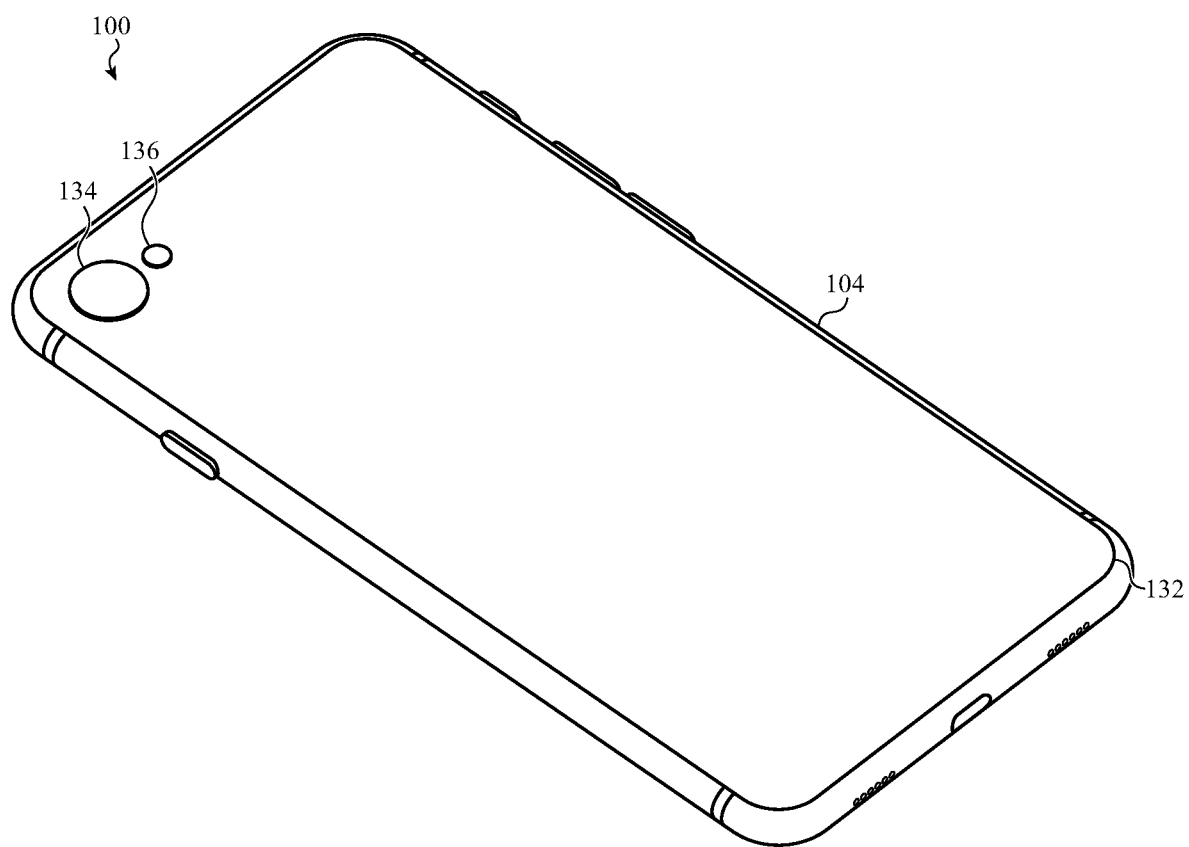

FIG. 1B illustrates a back side of the device 100. The device 100 may include a back cover 132 coupled to the housing 104. The back cover 132 may include a substrate formed of glass, though other suitable materials may alternatively be used (e.g., plastic, sapphire, ceramic, ceramic glass, etc.). The back cover 132 may define a back exterior surface of the device 100. The back cover 132 may include one or more decorative layers on the exterior or interior surface of the substrate. For example, one or more opaque layers may be applied to the interior surface of the substrate (or otherwise positioned along the interior surface of the substrate) to provide a particular appearance to the back side of the device 100. The opaque layer(s) may include a sheet, ink, dye, or combinations of these (or other) layers, materials, or the like. In some cases the opaque layer(s) have a color that substantially matches a color of the housing 104 (e.g., the exterior surfaces of the housing members and the joint structures). The device 100 may include a wireless charging system, whereby the device 100 can be powered and/or its battery recharged by an inductive (or other electromagnetic) coupling between a charger and a wireless charging system within the device 100. In such cases, the back cover 132 may be formed of a material that allows and/or facilitates the wireless coupling between the charger and the wireless charging system (e.g., glass).

The device 100 may also include a rear-racing camera 134 and a flash 136 that is configured to illuminate a scene to facilitate capturing images with the camera 134. The flash 136 is configured to illuminate a scene to facilitate capturing images with the camera 134. The flash 136 may include one or more light sources, such as one or more light emitting diodes (e.g., 1, 2, 3, 4, or more LEDs).

Figure 2A:
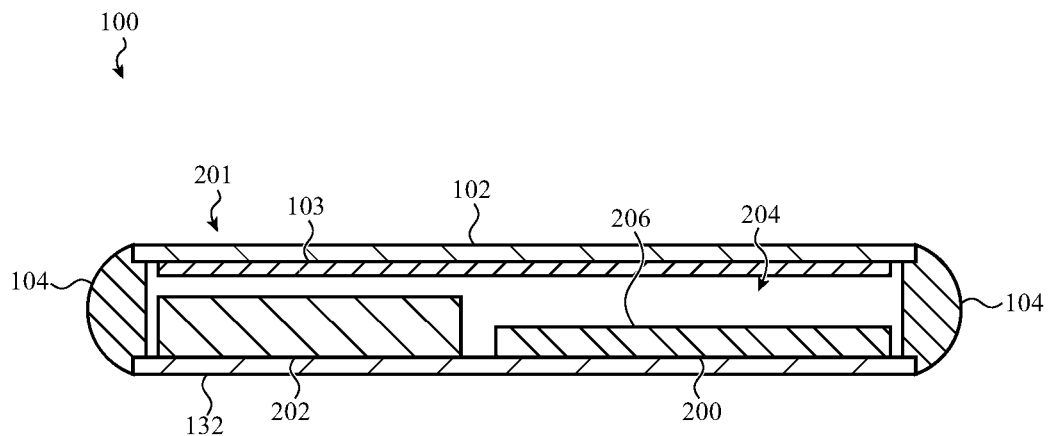
FIGS. 2A-2B depict a partial cross-sectional view of the electronic device of FIGS. 1A-1B.

FIG. 2A is a partial cross-sectional view of the device 100, viewed along line 2A-2A in FIG. 1A. FIG. 2A illustrates an example arrangement of components in the device 100. For example, the device 100 may include a battery 200 and an internal component 202. The internal component 202 may represent various different device components that may be within the device 100 and proximate the battery 200. For example, the internal component 202 may represent a circuit board (e.g., a main logic board), a display or portion of a display stack, a touch sensor, a processor, a speaker module, a haptic output device, a camera, a combination of these (or other) components, or the like.

The battery 200 and the internal component 202 may be positioned within an internal volume defined at least in part by the housing 104, the front cover 102, and the back cover 132. The battery 200 may be positioned below a top module 201, which may include the front cover 102, the display 103, and/or other optional components.

FIG. 2A illustrates the device 100 when the battery 200 has not undergone any dynamic dimensional transformation. In this configuration, the device 100 may include a clearance 204 or gap between a top surface 206 of the battery 200 and a bottom surface of the top module 201. The clearance 204 may be provided so that dynamic dimensional transformation of the battery may be accommodated without causing the battery to contact and/or press on the underside of the top module 201. In some cases the distance between the top surface 206 of the battery 200 and the bottom surface of the top module 201 (or the bottom surface of whatever component is above the battery), also referred to as the clearance 204, may be between about 8% to 12% of the height of the battery. For example, if the battery height (in the vertical direction as shown in FIG. 2A) is 4.0 mm, the distance between the top surface 206 of the battery 200 and the bottom surface of the top module 201 may be between about 4.16 mm and about 4.48 mm. Other dimensions of the battery 200 and the clearance 204 are also contemplated.

Figure 2B:
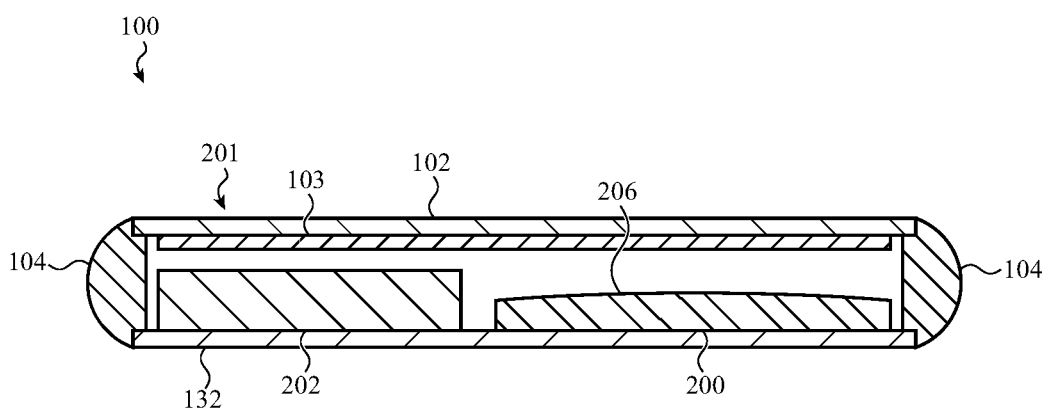

FIG. 2B illustrates the device 100 in a condition where the battery 200 has undergone a dynamic dimensional transformation. In particular, the dynamic dimensional transformation may be due, at least in part, to the presence of gasses within the enclosure (e.g., pouch) of the battery 200.

In order to alleviate dynamic dimensional transformation of the battery due to the presence of gasses within the battery enclosure, the battery 200 may include a gas release system that selectively releases gas from the battery 200. For example, the battery 200, or the device 100 more generally, may detect a presence of gas within the battery 200 or otherwise determine that the amount of gas or other gas condition within the battery 200 satisfies a criteria, and cause the gas release system to release gas from within the battery enclosure. Because the gas release system releases gas from the battery enclosure, dynamic dimensional transformation of the battery may be reduced, which in turn allows the device 100 to be designed with less clearance 204 between the battery 200 and the top module 201. Because the clearance 204 between the battery 200 and the top module 201 may be less, the device 100 may be made thinner and more compact, producing smaller and lighter devices that are easier to hold, use, and transport. Additionally or alternatively, because the required clearance is smaller, a larger battery may be fitted to the device without increasing the device's overall thickness and while still providing sufficient space between the battery and other internal components.

The larger battery may provide more energy storage capacity and allow greater time between charges.

Figure 3:
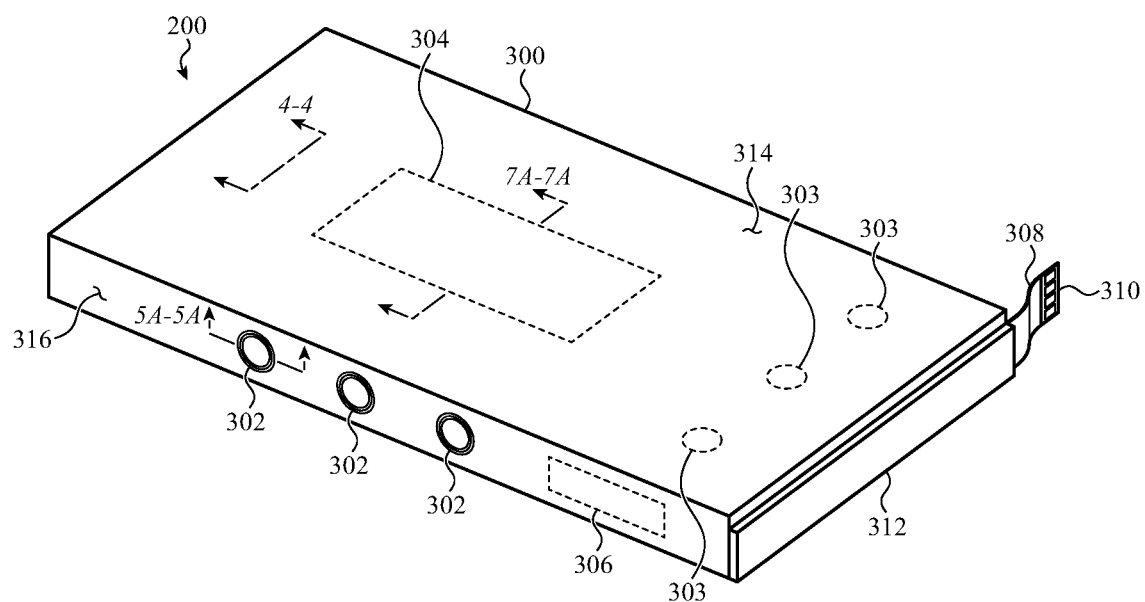
FIG. 3 depicts an example battery.

FIG. 3 is a perspective view of the battery 200. The battery 200 may include an enclosure, which may be a pouch 300. The pouch 300 may encase a battery cell, which may be a jellyroll structure that includes electrodes (e.g., an anode and a cathode) and an electrolyte. The anode and cathode may be rolled, folded, or otherwise manipulated to form a "jellyroll" type shape and/or structure.

The battery cell within the pouch 300 may be coupled to battery terminals that conductively couple to other components of a device (e.g., processors, memory, etc.) to provide electrical power to those components. In the battery 200 shown in FIG. 3, the battery terminals may be on or coupled to a flexible substrate 308. A connector 310 on the flexible substrate 308 may be conductively coupled to the battery terminals and may be used to physically and conductively couple the battery terminals to a corresponding connector within a device. In some cases, the battery terminals may be conductive traces that are applied to or otherwise integrated with the flexible substrate 308. The flexible substrate 308 may extend into the interior volume of the pouch 300 through an opening in the pouch 300. The opening in the pouch 300 may be sealed closed to form a flap 312, which may then be folded against and optionally attached (e.g., via adhesive) to a side of the pouch 300. The seal may be substantially air tight, such that a vacuum may be maintained in the pouch 300. In some cases, the vacuum within the pouch 300 may be around 0.01 mbar, or any other suitable value that is less than atmospheric pressure (e.g., less than about 1.0 bar).

The battery 200 may also include one or more gas release systems 302. The gas release systems may be configured to selectively release gas from within the pouch 300 (e.g., through a hole in the pouch). For example, as described herein, the gas release systems may include valves (e.g., microelectromechanical or "MEMS" valves) covering a hole in the pouch 300 and that can be selectively opened and closed based on the gas condition within the battery 200 to release gas from the pouch 300. The gas release systems 302 may also include gas-permeable, waterproof membranes that extend across the holes in the pouch to allow gas to exit the pouch 300 while keeping electrolyte or other liquid, gel, or non-gaseous materials within the pouch 300 even while the valves are open. The gas-permeable, waterproof membranes may also prevent ingress of liquids into the pouch 300 while the valves are open.

The gas release systems 302 may be positioned on or along a minor side 316 of the battery 200, rather than a major side of the battery 200 (e.g., a front or top side 314). By positioning the gas release systems 302 along the minor side 316, any distance that the gas release systems 302 extend beyond the surface of the battery pouch 300 does not increase the thickness of the battery (e.g., the height dimension as oriented in FIG. 2A), and thus does not increase the thickness of the device (e.g., the distance from the exterior surface of the cover 102 to the exterior surface of the back cover 132). Further, when the battery 200 is manufactured, a compressive force may be applied to the major surfaces of the battery 200 (e.g., the top side 314 and the bottom side opposite the top side 314). By placing the gas release systems 302 on the minor side 316 (or on any other side that is not subjected to high compressive forces during battery manufacturing), the gas release systems may avoid damage from the compressive forces.

In some cases, the manufacturing processes of the pouch 300 and/or battery more generally allow for the placement of the gas release systems 302 elsewhere on the battery 200, such as the top side 314, the bottom side, a different minor side, or the like. For example, a pouch formation process may include or result in a deformation and/or stretching of the pouch material, which may be limited to or more pronounced along the minor sides of the pouch. In such cases, the gas release systems 302 (or portions thereof) may be formed on a major side of the battery prior to the pouch formation process to prevent or limit damage to the gas release systems 302 as a result of the formation process. For example, the gas release systems 302 may be positioned at locations 303 on the top side 314 (though other locations on the top or bottom side are also contemplated).

The battery 200 may also include one or more components of a sensing system that is configured to detect a gas condition within the battery enclosure (e.g., a vacuum level within the enclosure, a pascal or bar value, or the like). As used herein, a sensing system may refer to or include the hardware, software, firmware, computer programs, or the like, that are used to sense and/or detect conditions and/or values. In some cases, a sensing system, such as a gas condition sensing system, may include various components, some of which may be shared by other systems or subsystems of the device or otherwise used for multiple purposes. For example, as described herein, a gas-condition sensing system may include a resistive sensor (e.g., a conductor that changes resistance when its shape or dimensions are changed) and a processor and/or processing system configured to correlate electrical values of the resistive sensor to pascal values. In some cases, the processing system includes a Wheatstone bridge.

Returning to FIG. 3, the battery 200 may include sensing components 304 and/or 306. The sensing component 304 is shown positioned on or along the top side 314, and the sensing component 306 is shown positioned on or along the minor surface (or side surface) 316. The sensing components 304, 306 are shown in FIG. 3 to illustrate example locations for sensing components on a battery, and the depicted quantity and locations of the sensing components are not meant to be limiting. Thus, more, fewer, and/or differently located sensing components may be used on a battery as described herein.

The sensing components 304, 306 shown in FIG. 3 may represent various different types of sensor components for a gas-condition sensing system. The sensing components 304, 306 may be positioned on and/or integrated with the pouch 300. As noted herein, the pouch 300 may be formed of a flexible laminate that includes barrier layers to prevent ingress of gasses into the pouch and to prevent electrolyte from leaving the pouch. Because the pouch is flexible, the sensing components 304, 306, which are on and/or integrated with the pouch 300, can facilitate detection of dynamic dimensional transformations of the pouch.

In some cases the sensing components 304, 306 are resistive sensors that, together with the rest of the sensing system, can correlate dimensional transformations of the pouch 300 (e.g., due to the presence of gas) to pascal values within the pouch. In some cases, the sensing components 304, 306 are or include conductive members that are in contact with one another, but separate from one another (and thus break electrical continuity) when the pouch undergoes a dynamic dimensional transformation. In some cases, the sensing components 304, 306 may be or may include transducers that, together with the rest of the sensing system, determine and/or detect a gas condition within the pouch 300. Example transducers may use piezoelectric and/or piezoresistive elements on or inside the pouch 300. Other types of sensing systems may also be used, and suitable components of those sensing systems may be included with the battery 200. For example, the sensing components 304, 306 may be or include a sensing probe that is configured to sense the presence, amount, and/or concentration of a particular gas or other compound. As described herein, the sensing system (including the sensing component 304 and/or 306) may be used to determine when and for what duration to open a valve of a gas release system in order to release gas from the pouch. The sensing system may also be used to determine when to operate other systems to assist in the release of gas from the pouch. For example, the sensing system may be used to determine how and for what duration to operate a pump to assist in releasing or forcing gas from the pouch 300.

Figure 4:
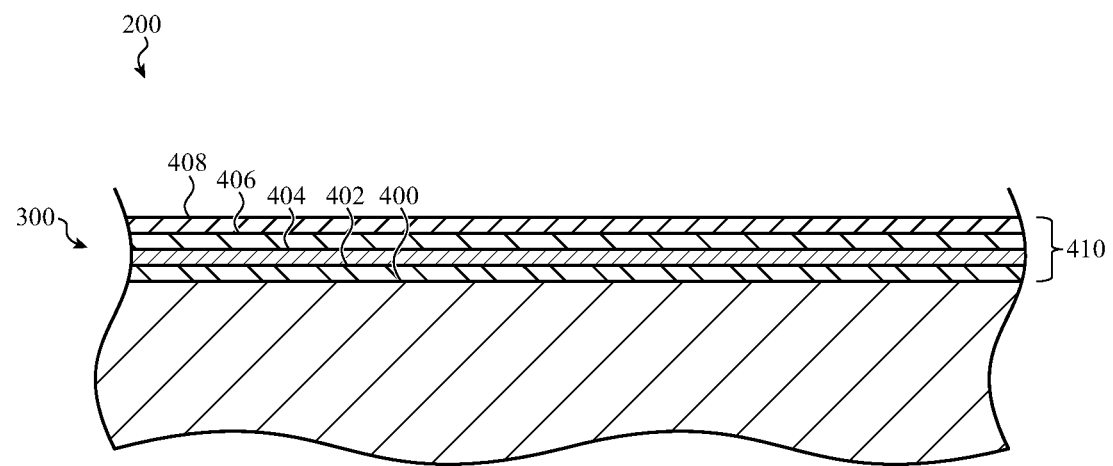
FIG. 4 depicts a partial cross-sectional view of the battery of FIG. 3.

FIG. 4 is a partial cross-sectional view of a portion of the battery 200, viewed along line 4-4 in FIG. 3, showing details of the construction of the pouch 300. The pouch 300, which is one example of a battery enclosure, may encase a battery cell 400 in an interior volume of the enclosure. As noted above, the battery cell 400 may include components such as an anode, a cathode, an electrolyte, and/or other suitable components for storing and providing electrical power to a device.

The pouch 300 may include a wall 410 that is defined by a laminate. The laminate may include a first polymer layer 402 that defines an interior surface of the pouch, a metallic layer 404 over the first polymer layer 402, an adhesive layer 406 over the metallic layer 404, and a second polymer layer 408 over the adhesive layer 406 and defining an exterior surface of the pouch 300. In some cases, the laminate that forms the wall 410 (and the pouch 300 more generally) may be formed of or include more, fewer, and/or different layers than those shown in FIG. 4.

The first polymer layer 402 may be a polypropylene or other non-conductive, flexible polymer film or layer. The first polymer layer 402 define an interior surface of the interior volume of the pouch and may be configured to prevent contact between the battery cell 400 and the metallic layer 404. The metallic layer 404 may be formed from or include aluminum or another flexible metallic film or layer. The metallic layer 404 may provide strength and dimensional stability to the pouch 300, and may define a liquid and gas impermeable layer (e.g., a barrier layer) between the battery cell 400 and the exterior environment.

The adhesive layer 406 may be configured to bond the second polymer layer 408, which defines the exterior surface of the battery 200, to the metallic layer 404. The adhesive may be any suitable coating, film, tape, or the like, that bonds the second polymer layer 408 to the metallic layer 404.

The second polymer layer 408 may be a nylon, polyamide, or other non-conductive, flexible polymer film or layer. The second polymer layer 408 may be pigmented, coated, painted, or otherwise made to be opaque.

In order to form the pouch 300, a sheet of the laminate may be formed into a pouch shape, including by deforming, folding, and/or bonding the laminate, with the battery cell 400 inside the pouch 300. The pouch 300 may then be evacuated and sealed to contain the battery cell 400 within the pouch.

Figure 5A:
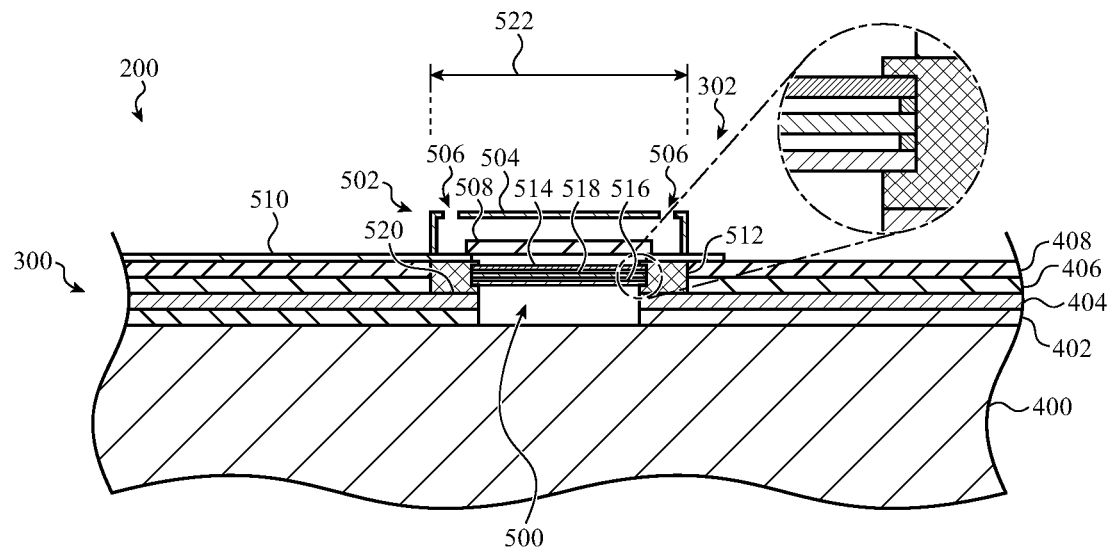
FIGS. 5A-5B depict partial cross-sectional views of the battery of FIG. 3.

As noted above, one or more gas release systems may be incorporated with the battery 200. FIG. 5A is a partial cross-sectional view of the battery 200, viewed along line 5A-5A in FIG. 3, illustrating an example configuration of the gas release system 302.

As noted above, the gas release system 302 may include a valve, such as the valve 502, that is configured to selectively release gas from the pouch 300, and a gas-permeable membrane 518 that is configured to prevent liquid from escaping the pouch.

The gas-permeable membrane 518 may be a porous membrane, such as expanded polytetrafluoroethylene. The pores in the gas-permeable membrane 518 may be sufficiently large that gasses within the pouch 300 may pass through the gas-permeable membrane 518, but sufficiently small that liquids or gels, such as the electrolyte in the battery cell 400, do not pass through the gas-permeable membrane 518. The gas-permeable membrane 518 may be reinforced on one or both sides by mesh materials 514, 516 (e.g., mesh screens). Where both mesh materials 514, 516 are included, the gas-permeable membrane 518 may be positioned between the mesh materials 514, 516. In cases where only one mesh material is used, it may be positioned either above or below the gas-permeable membrane 518.

The mesh materials 514, 516 may be formed of any suitable material, such as metal, polymer, carbon fiber, or the like. In some cases, the mesh may be stiffer than the gas-permeable membrane 518 to prevent or limit deformation and/or deflection of the gas-permeable membrane 518. The mesh materials 514, 516 may be in contact with the gas-permeable membrane 518, or they may be separated from the gas-permeable membrane 518 by a space. In the latter case, the space between the gas-permeable membrane 518 and the mesh material may prevent the mesh materials from abrading, tearing, or otherwise damaging the gas-permeable membrane 518.

The gas-permeable membrane 518 and the mesh materials 514, 516 may be mounted in a frame member 512, which may in turn be positioned in (or otherwise extend over) a hole 500 formed through the pouch 300 (e.g., through the first polymer layer 402, the metallic layer 404, the adhesive layer 406, and the second polymer layer 408). The hole 500 may be formed through the pouch 300 before or after the laminate material is formed into the pouch shape.

The frame member 512 may be positioned on and/or bonded to one of the layers of the laminate that forms the pouch 300. For example, the metallic layer 404 may define a ledge 520 within the hole 500, and the frame member 512 may be positioned on and/or bonded to the metallic layer 404. In some cases, the ledge 520 is defined by a different layer of the pouch 300. For example, the ledge 520 may be defined by the first polymer layer 402, or the adhesive layer 406. In some cases, the frame member 512 is positioned on the second polymer layer 408. In such case, a ledge may not be defined in the hole 500, and/or any defined ledge may not support the frame member 512. The frame member 512 may be held in place on the pouch 300 via an adhesive, a fastener, by overlapping one or more of the pouch layers on a portion of the frame member 512, or the like.

Figure 6A:
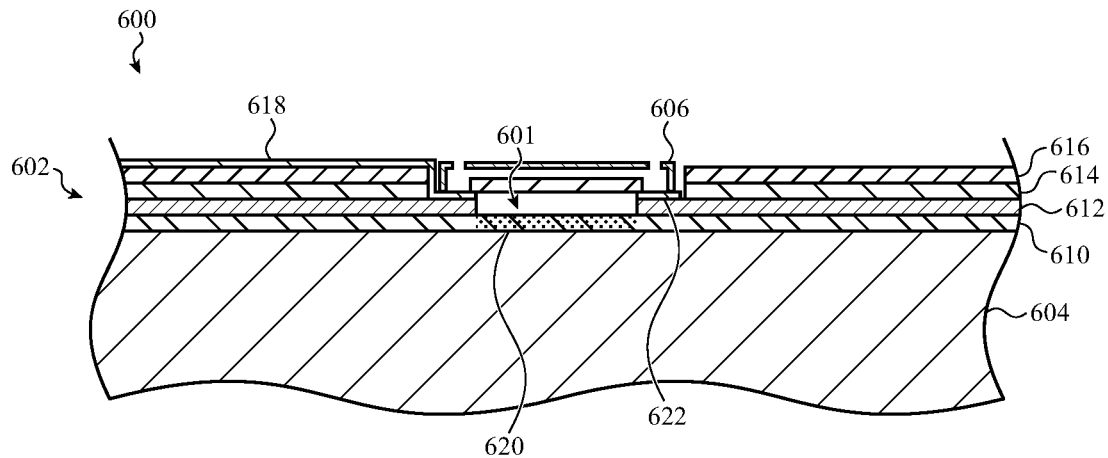
FIGS. 6A-6D depict partial cross-sectional views of example batteries.
Figure 6B:
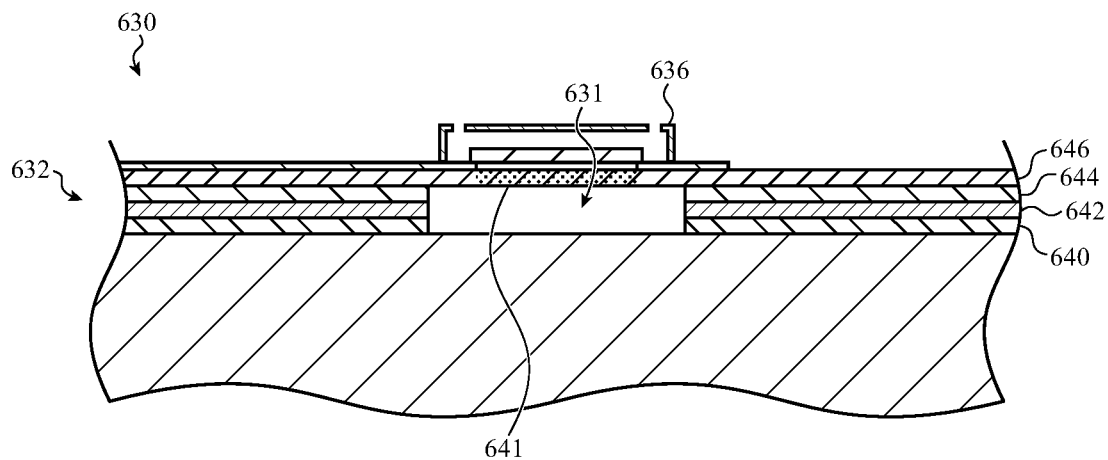
Figure 6C:
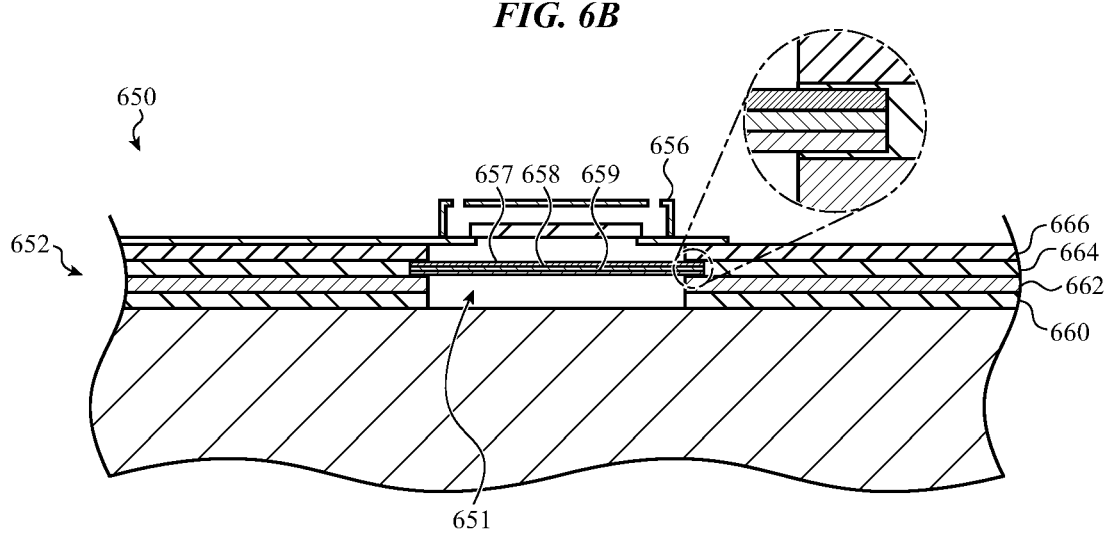

In some cases, the frame member 512 may be omitted, and the gas-permeable membrane 518 and the optional mesh materials 514, 516 may be integrated with the layers of the pouch laminate. For example, the gas-permeable membrane 518 and the optional mesh materials 514, 516 may be larger (e.g., in diameter) than the hole 500, and peripheral portions of the gas-permeable membrane 518 and the optional mesh materials 514, 516 may be sandwiched between layers. For example, the gas-permeable membrane 518 and the optional mesh materials 514, 516 may be sandwiched between the second polymer layer 408 and the metallic layer 404 (as shown in FIG. 6C). In some cases, the gas-permeable membrane 518 and the optional mesh materials 514, 516 may be sandwiched between different pairs of layers.

FIG. 5A also illustrates an example configuration for the valve 502. The valve may be a microelectromechanical (MEMS) component that can be controlled by the battery 200 and/or the device that contains the battery. In some cases, the valve 502 may have an outer dimension (e.g., a diameter, if the valve 502 has a circular shape) that is between about 0.001 mm and about 3.0 mm. In some cases, the valve may include an array of MEMS valve structures, with each valve structure defining a passage having a dimension (e.g., a diameter) between about 0.001 mm and about 0.1 mm, and with the overall valve (including the array of discrete passages) having a dimension (e.g., diameter or other dimension) between about 1.0 mm and about 10.0 mm.

The valve 502 may be attached to a circuit substrate 510, such as a rigid or flexible circuit board. The valve 502 may be selectively actuated by a device to be opened or closed. In such cases, electrical or other signals may be transmitted to and/or from the valve 502 via conductors on or in the circuit substrate 510. For example, a conductive trace on the circuit substrate 510 may provide an electrical signal to the valve 502 that causes the valve to open or close.

The valve 502 may include a shell 504 that defines one or more holes 506, and a sealing element 508 in the shell 504. The sealing element 508 may be configured to be selectively transitioned between a closed position and an open position in different modes of operation. FIG. 5A, for example, shows the sealing element in a closed position (which may correspond to a second mode of operation of the valve 502), in which the sealing element 508 is maintained against the circuit substrate 510 (though in other configurations it may be sealed against a different component of the valve 502 or pouch 300). The valve 502 may be maintained in the closed position by a spring, magnet, electromagnet, electromagnetic force, or any other suitable means. In some cases, the valve 502 (e.g., the sealing element 508) is mechanically biased in the closed position, such as via a spring, and is temporarily forced into an open position (e.g., via an electromagnetic force) in response to a signal being provided to the valve 502.

Figure 5B:
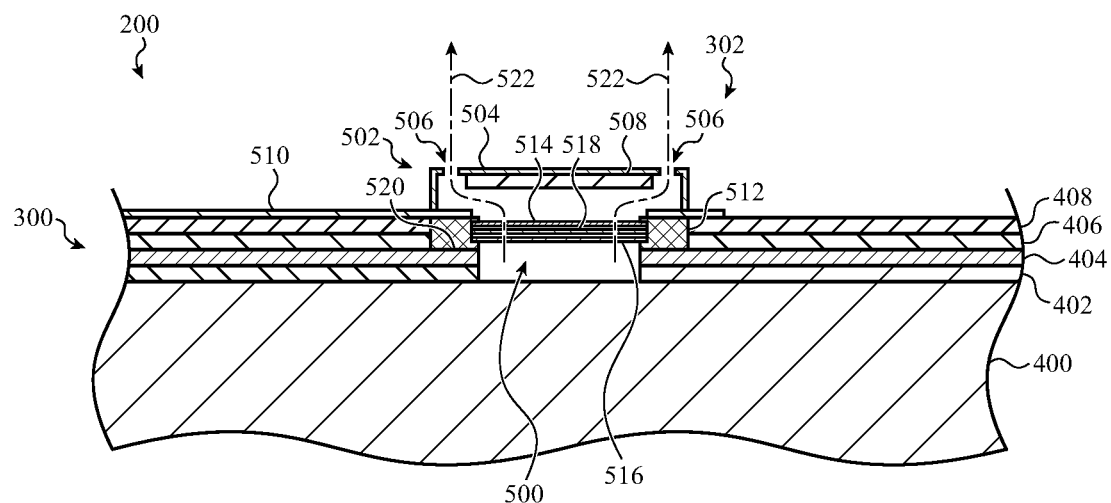

FIG. 5B illustrates the valve 502 in an open position (which may correspond to a first mode of operation of the valve 502), in which the sealing element 508 is moved to release gas from the pouch 300 through the hole 500. For example, gas may travel through the gas-permeable membrane 518 and the optional mesh materials 514, 516, and through the holes 506 (as illustrated by arrows 522). The valve 502 may be caused to open by any suitable means, such as an electromagnetic force.

While the valve 502 (and other valves described herein) is shown as having a particular mechanical configuration, this is merely one example configuration for a valve that may be implemented according to the instant application. Indeed, other types and/or configurations of valves may also be used, and such valves may provide the same and/or similar functionality (e.g., selective and electrically-controllable opening and closing) as that described with reference to the valve 502. The valves described herein may be normally-closed valves in which, in the absence of a signal, an applied electrical current, or other actuation command, the valve is maintained or biased in a closed position (e.g., via a spring or another biasing mechanism or material). The valves may also be configured to move to or remain in an open position if a certain condition is detected by the battery and/or a device, if the battery stops providing electrical power, or the like.

In some cases, the function of the gas-permeable, waterproof membrane (e.g., the membrane 518) is performed by another component. FIGS. 6A-6B illustrate example configurations of pouches in which the gas-permeable membrane is defined by a porous region of one or more of the layers of the pouch.

FIG. 6A is a partial cross-sectional view of a battery 600 that includes a pouch 602, a battery cell 604, and a valve 606 in a hole that is formed through at least some of the layers of the pouch 602. The battery 600, pouch 602, battery cell 604, and valve 606 may be the same as or similar in construction, materials, and/or function to the battery 200, pouch 300, battery cell 400, and valve 502, and for brevity those details are not repeated here.

The pouch 602 may include a wall that is defined by a laminate. The laminate may include a first polymer layer 610 that defines an interior surface of the pouch, a metallic layer 612 over the first polymer layer 610, an adhesive layer 614 over the metallic layer 612, and a second polymer layer 616 over the adhesive layer 614 and defining an exterior surface of the pouch 602. These layers may be the same as or similar in construction, materials, and/or function to the corresponding layers described with respect to FIG. 4, and for brevity those details are not repeated here.

As shown in FIG. 6A, the pouch 602 may define a hole 601 that extends through the second polymer layer 616, the adhesive layer 614, and the metallic layer 612. The first polymer layer 610 may define a porous region 620 that is generally aligned with or otherwise spans the hole. The porous region 620 may be gas-permeable and waterproof (e.g., liquid-impermeable), and may provide functionality that is the same as or similar to the gas-permeable membrane 518. For example, the porous region 620 may be operative to allow gas to pass from inside the pouch 602, while preventing or limiting liquid (e.g., electrolyte) from leaking out. The porous region 620 may be formed in any suitable manner, including by forming holes through the first polymer layer 610 (e.g., with a laser or other suitable technique). The holes may be less than about 5 microns in diameter, or less than about 1 micron in diameter.

The battery 600 may also include a valve 606, which may be positioned at least partially within the hole 601. The valve 606 may be attached to a circuit substrate 618, such as a rigid or flexible circuit board. The valve 606 (and/or the circuit substrate 618) may be seated on and attached to one of the layers of the pouch 602. For example, as shown in FIG. 6A, the metallic layer 612 may define a ledge 622 within the hole 601 on which the valve 606 may be positioned (and optionally attached, e.g., via adhesive).

In this way, the extent to which the valve 606 extends beyond the exterior surface of the second polymer layer 616 may be reduced (e.g., the valve 606 is set into the hole 601 to reduce the footprint of the battery 600). In some cases, the valve 606 is flush with or recessed relative to the exterior surface that is defined by the second polymer layer 616.

FIG. 6B illustrates an example battery 630 that includes a pouch 632 defined by a laminate that includes a first polymer layer 640 that defines an interior surface of the pouch, a metallic layer 642 over the first polymer layer 640, an adhesive layer 644 over the metallic layer 642, and a second polymer layer 646 over the adhesive layer 644 and defining an exterior surface of the pouch 632. The battery 630 also includes a valve 636 positioned over a hole 631 formed in the laminate. These components may be the same as or similar in construction, materials, and/or function to the corresponding components described herein, and for brevity those details are not repeated here.

Whereas FIG. 6A included a porous region of the first polymer layer (e.g., the layer closest to the battery cell), FIG. 6B illustrates an embodiment in which the porous region 641 is defined by the second polymer layer 646. The porous region 641 may be produced by forming holes (e.g., less than about 5 microns, less than about 1 micron) through the second polymer layer 646 (e.g., with a laser). Similar to the gas-permeable membrane and the porous region 620, the porous region 641 may be gas-permeable and waterproof to allow gas to leave the pouch while preventing or inhibiting the passage of liquid (e.g., battery electrolyte).

FIG. 6C illustrates an example battery 650 that includes a pouch 652 defined by a laminate that includes a first polymer layer 660 that defines an interior surface of the pouch, a metallic layer 662 over the first polymer layer 660, an adhesive layer 664 over the metallic layer 662, and a second polymer layer 666 over the adhesive layer 664 and defining an exterior surface of the pouch 652. The battery 650 also includes a valve 656 positioned over a hole 651 formed in the laminate. These components may be the same as or similar in construction, materials, and/or function to the corresponding components described herein, and for brevity those details are not repeated here.

The battery 650 also includes a gas-permeable membrane 658 and optional mesh materials 657, 659, which may be similar in materials, construction, and function to the gas-permeable membrane 518 and the mesh materials 514, 516. The gas-permeable membrane 658 and optional mesh materials 657, 659 may be sandwiched between layers of the pouch 652. In particular, a peripheral portion of the gas-permeable membrane 658 and optional mesh materials 657, 659 may be positioned between the metallic layer 662 and the second polymer layer 666, such that the metallic layer 662 and the second polymer layer 666 (and optionally the adhesive layer 664) retain the gas-permeable membrane 658 and optional mesh materials 657, 659 in position over the hole 651. In other implementations, the gas-permeable membrane 658 and optional mesh materials 657, 659 may be positioned between other layers of the laminate.

Figure 6D:
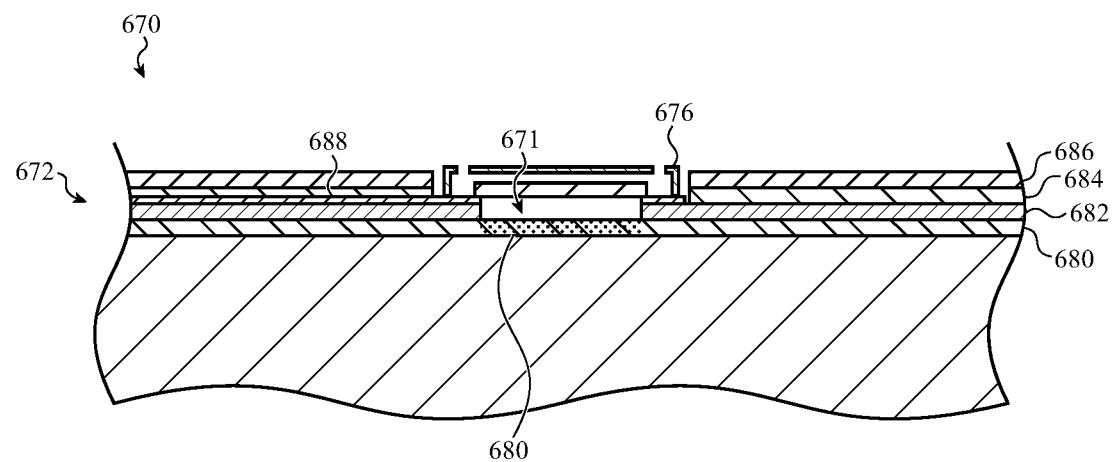

FIG. 6D illustrates an example battery 670 that includes a pouch 672 defined by a laminate that includes a first polymer layer 680 that defines an interior surface of the pouch, a metallic layer 682 over the first polymer layer 680, an adhesive layer 684 over the metallic layer 682, and a second polymer layer 686 over the adhesive layer 684 and defining an exterior surface of the pouch 672. The battery 670 also includes a valve 676 positioned over a hole 671 formed in the laminate. These components may be the same as or similar in construction, materials, and/or function to the corresponding components described herein, and for brevity those details are not repeated here.

Whereas FIG. 6A showed a circuit substrate 618 that extended along an exterior surface of the pouch and extended into a hole in the pouch, FIG. 6D illustrates an embodiment in which the circuit substrate 688 (to which the valve 676 is attached) is positioned between layers of the laminate that defines the pouch 672. As shown, the circuit substrate 688 (which may be a flexible circuit substrate) is positioned on the metallic layer 682. The circuit substrate 688 may exit the pouch through an opening in the pouch, similar to the flexible substrate 308 (FIG. 3). In some cases, the circuit substrate 688 may be conductively coupled to the flexible substrate 308, and the circuit substrate 688 (and the valve 676) may be conductively coupled to other components of the device via a connector on the flexible substrate 308. In other cases, the circuit substrate 688 exits the pouch at a different location to facilitate conductive coupling between the valve 676 and other components of the device.

Figure 7A:
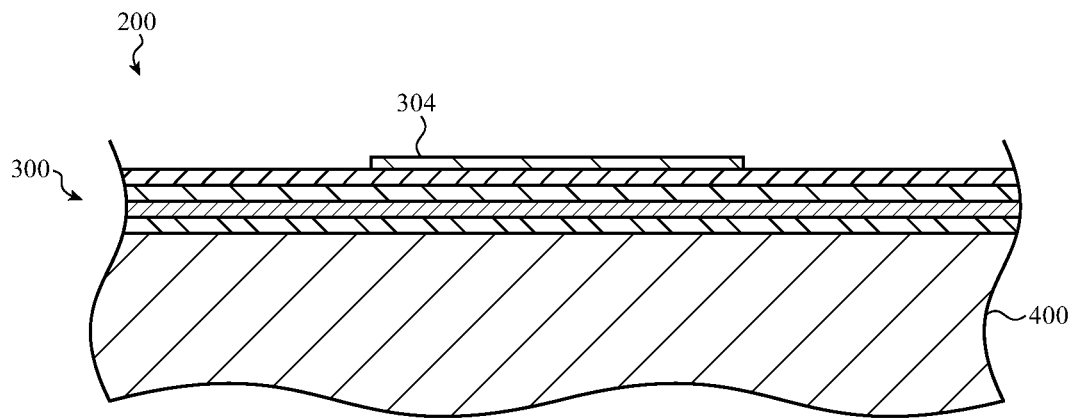
FIGS. 7A-7B depict partial cross-sectional views of the battery of FIG. 3.
Figure 7B:
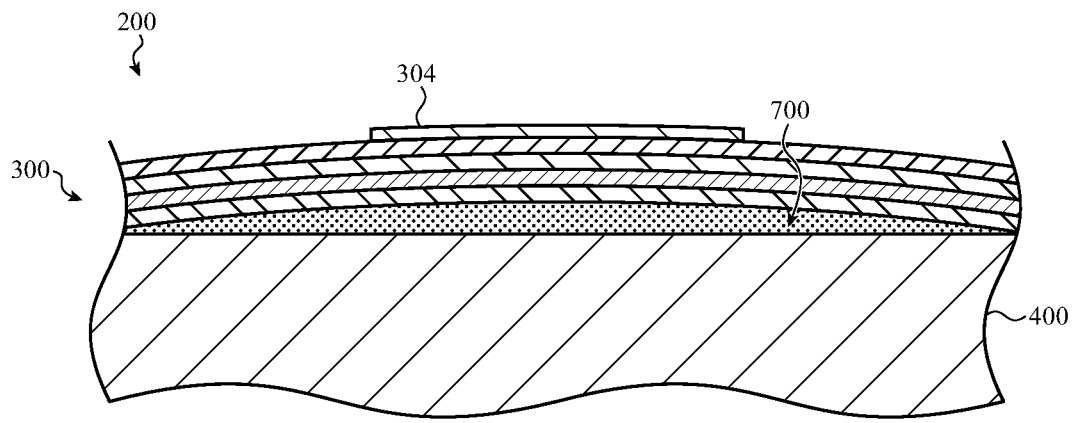

As noted above, devices may include sensing systems that detect the presence or amount of gas in a battery, so that the device, or battery more specifically, can determine when to open and/or close the valve to release the gas from within the pouch. FIGS. 7A-7B illustrate a partial cross-sectional view of the battery 200, viewed along line 7A-7A in FIG. 3, in which a component 304 of a sensing system is attached to a pouch 300 of the battery 200. The component 304 may be any suitable component that facilitates the detection of gas in the battery 200. In some cases, the component 304 is a resistive sensor or other suitable component that detects a gas condition based on a physical characteristic of the pouch 300. For example, when gas is inside the pouch 300, the presence of the gas may cause dynamic dimensional transformation of the pouch 300, which may be detected by the resistive sensor or other suitable component.

In some cases, the component 304 is a fuse-like circuit in which two conductors are in contact with one another. When gas is in the pouch 300, a resulting dynamic dimensional transformation of the pouch may cause the conductors to separate, thereby producing an open circuit. The sensing system may detect the open circuit, and control the gas release system (e.g., by opening a valve) in response to detecting the open circuit. The sensing system may also close the valve in response to detecting that the circuit has closed again.

The component 304 may be conductively coupled to other components of a sensing system (e.g., a processor). In some cases, the sensing system may be part of the battery, such that the battery itself can monitor for gas in the pouch and actuate (e.g., open and/or close) the valve when necessary. In other cases, some portion of the sensing system is part of the device in which the battery is integrated, and the sensing system is conductively and/or communicatively coupled to sensing system components on the battery.

FIG. 7A illustrates the battery 200 in a state where the battery 200 has undergone little or no dynamic dimensional transformation, and FIG. 7B illustrates the battery 200 in a state where the battery 200 has undergone dynamic dimensional transformation and there is gas 700 in the pouch. In some cases, in the initial state of the battery, the pouch is evacuated. Accordingly, even small changes in the amount of gas in the pouch may result in dynamic dimensional transformation or other physical changes in the shape and/or size of the pouch 300. Further, the amount of dynamic dimensional transformation of the pouch 300 may be proportional to a gas condition in the pouch. Accordingly, the component 304 (e.g., a resistive sensor), in conjunction with the sensing system as a whole, may be able to determine the gas condition (e.g., a pascal or bar value) in the pouch 300 based on the detected dynamic dimensional transformation. In some cases, the sensing system may determine whether a gas condition within the pouch 300 satisfies a criteria (e.g., is above and/or below a particular value), even without determining a numerical value. For example, if the component 304 (and/or the sensing system as a whole) detects that the pouch has experienced a predetermined amount of dynamic dimensional transformation, the sensing system may determine that the gas condition in the pouch 300 satisfies a criteria. If the component 304 detects a dynamic dimensional transformation that is below the predetermined amount, the sensing system may determine that that the gas condition in the pouch 300 does not satisfy the criteria.

Figure 7C:
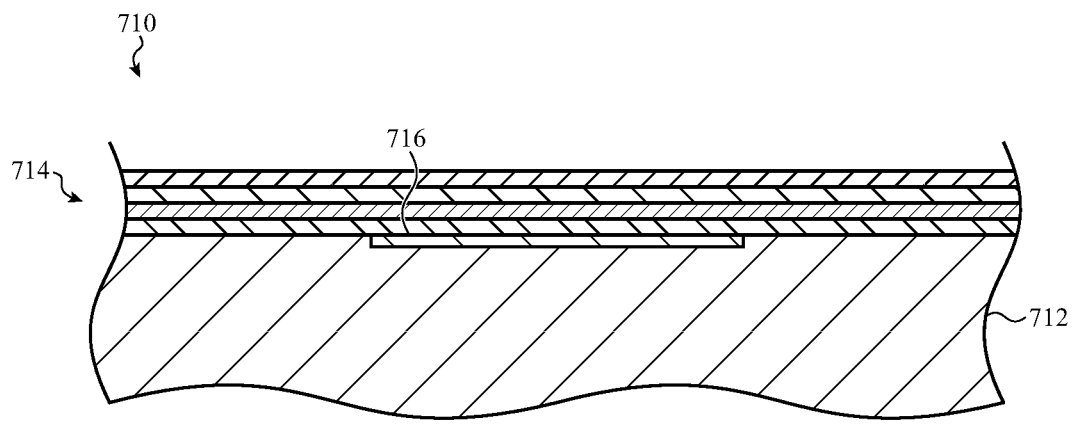
FIG. 7C depicts a partial cross-sectional view of another example battery.

FIG. 7C illustrates a partial cross-sectional view of a battery 710 that includes a component 716 of a sensor within the pouch 714 (e.g., with the battery cell 712, which may be the same as or similar to the battery cell 400). The component 716 may be a resistive sensor, a piezoelectric sensor, or any other suitable component. In such cases, the component 716 may be attached to the pouch 714 so that dynamic dimensional transformations of the pouch are transferred to the component 716. In some cases, the component 716 may be a force transducer. In some cases, the component 716 may be a gas sensor (or component thereof) that can detect a presence, amount, and/or concentration of gas in the pouch 714. The component 716 may be conductively coupled to other components of a sensing system via conductors (e.g., a flex circuit, wires, conductive traces, etc.), which may exit the pouch 714 with the battery terminals (e.g., on the flexible substrate 308, FIG. 3).

Figure 8A:
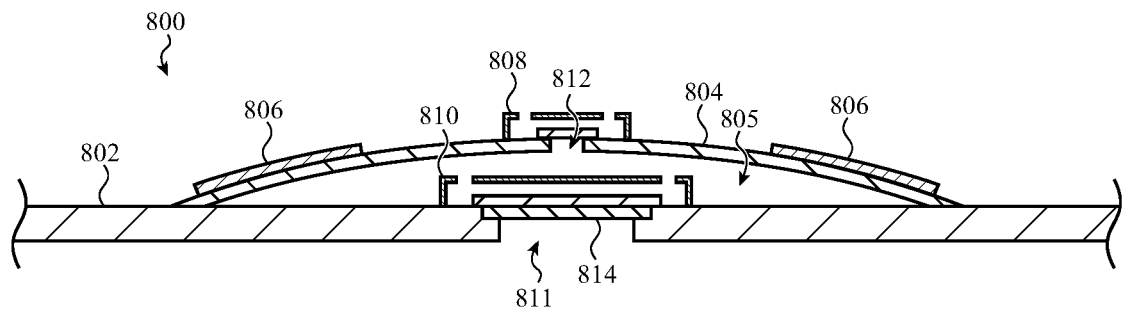
FIGS. 8A-8C depict partial cross-sectional views of a pump for a battery.
Figure 8B:
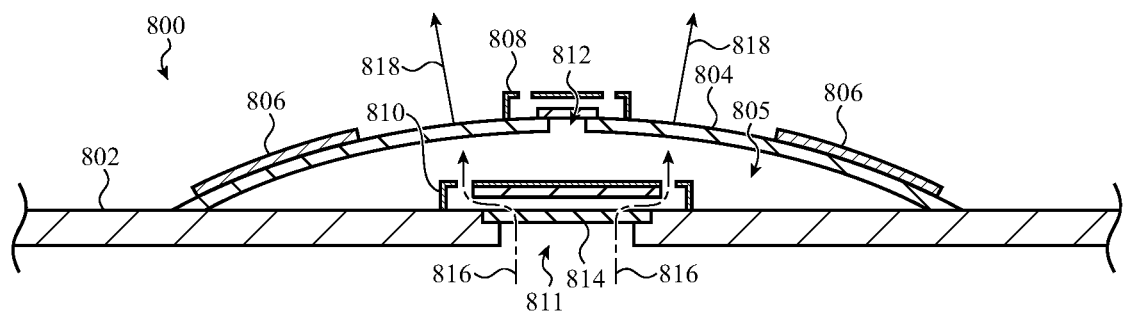
Figure 8C:
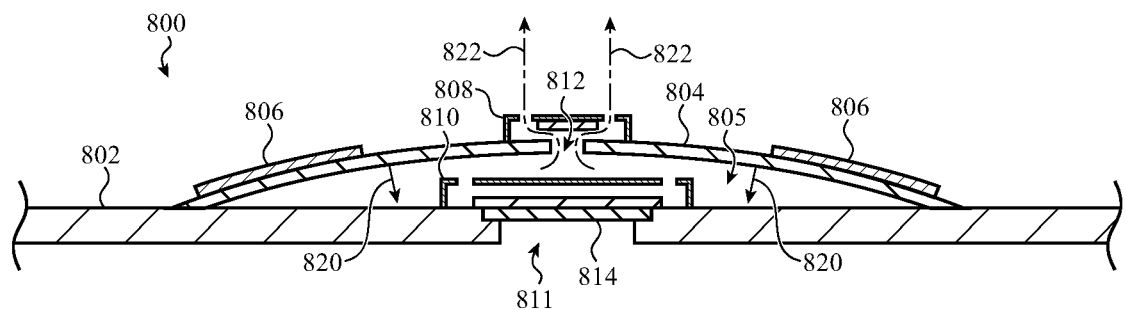
Figure 9A:
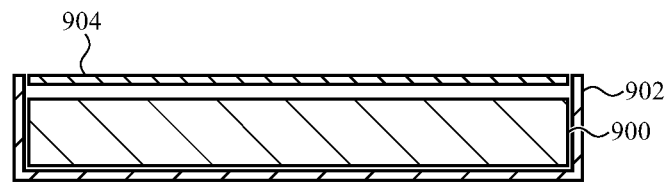
FIGS. 9A-9B depict partial cross-sectional views of another pump for a battery.
Figure 9B:
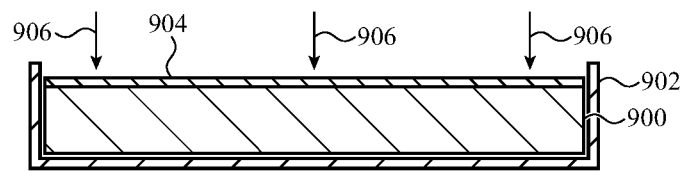

In some cases, gasses within a battery may naturally leave the pouch when a valve is commanded to open. In other cases, a battery may include a pump that is configured to assist in the release of gas from within the pouch. FIGS. 8A-8C depict an example pump that uses a diaphragm to assist in releasing gas from the pouch, and FIGS. 9A-9B depict an example pump that uses a compressive force on the battery to assist in releasing gas from the pouch.

With reference to FIG. 8A, a pump 800 may be coupled to a battery pouch 802 (which may be an embodiment of other pouches described herein). The pump 800 may include a diaphragm 804 and actuators 806 that are configured to cause the diaphragm 804 to move to produce a pumping action of the diaphragm 804. The actuators 806 may be piezoelectric materials or any other suitable mechanism or material that can change the shape of the diaphragm 804. The diaphragm 804 may define a hole 812, and a first valve 808 over the hole 812. The pouch 802 may define a hole 811, with an air-permeable membrane 814 across the hole 811 and a second valve 810 across the hole 811.

In order to draw gas from the pouch, while also preventing external air into the pouch, the diaphragm 804 may be (1) expanded to draw gas out of the pouch 802 and into the volume under the diaphragm, and (2) contracted to push the gas out of the volume under the diaphragm. FIG. 8B illustrates the pump 800 with the diaphragm expanding (e.g., to expand the volume 805 under the diaphragm 804). In particular, the actuators 806 may cause the diaphragm 804 to expand, as illustrated by arrows 818, such that the volume 805 increases. This increase in volume may draw gas through the hole 811, through the membrane 814, through the now-open valve 810, and into the volume 805.

Once the gas is drawn into the volume 805, the second valve 810 may be closed and the diaphragm 804 may be contracted to shrink the volume 805, thereby pushing the gas out of the volume 805, through the hole 812 and through the open first valve 808. FIG. 8C illustrates the pump 800 with the diaphragm 804 contracted, as indicated by arrows 820. The second valve 810 is closed to prevent the gas from being forced back into the pouch, and the first valve 808 is open to allow the gas to be pushed out of the volume 805, as indicated by arrows 822.

The first and second valves 808, 810 may be passive valves that are forced open and/or closed based on the volume changes produced by the movement of the diaphragm 804. In some cases, one or both of the first and second valves 808, 810 may be selectively actuated (e.g., commanded to open or close) by a processing system. Further, one or both of the first and second valves 808, 810 may be biased in a closed position by a spring or other biasing structure.

Electrical components that are attached to a battery pouch (e.g., valves, resistive sensors, transducers, pump actuators etc.) may be conductively coupled to other components, circuitry, or the like, via conductive traces that are integrated with one or more layers of the pouch. For example, the second polymer layer of a pouch (e.g., the outermost layer) may include conductive traces that are conductively coupled to the electrical components on the pouch, and which may carry signals between the components on the pouch and other circuitry within the device. Conductive traces may be on or between other layers of the pouch as well.

FIGS. 9A-9B illustrate another example mechanism for assisting in the release of gas from a battery. In particular, FIG. 9A illustrates a battery 900 positioned in a rigid frame 902. The rigid frame 902 may be a metal or polymer frame, or it may be defined by adjacent components within a device (e.g., circuit boards, housing members, or other internal structures of a mobile phone, tablet, laptop computer, or the like). A plunger 904 may be configured to press on the battery 900 to push gases out of the battery (e.g., through a gas release system as described herein). FIG. 9B illustrates the plunger 904 pressing against the battery 900 (as indicated by arrows 906) to help push gasses out of the pouch. In cases where the gas release system includes a selectively actuatable valve, the valve may be commanded to open while the plunger 904 is pressing on the battery, and commanded to close as the plunger 904 reaches the end of its travel (e.g., when it is done pressing on the battery 900 but before it ceases to press on the battery 900).

Figure 9C:
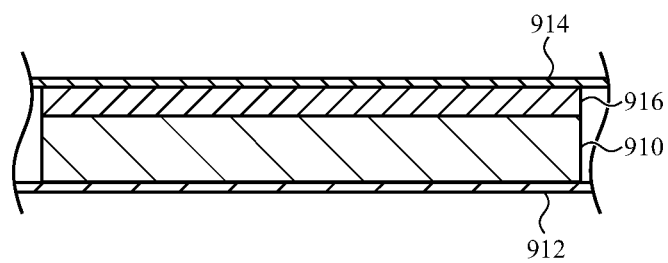
FIG. 9C depicts a partial cross-sectional view of a biased battery.

FIG. 9C illustrates a battery 910 that is subjected to a biasing force in order to assist in the release of gas from within the pouch when the valve is opened. For example, the battery 910 may be positioned between a bottom structure 912 of the device (e.g., a back housing member), and a top structure 914 (e.g., a front or top housing member, a display stack, or the like). A biasing member 916 may be positioned between the battery 910 and one of the top 914 or the bottom structure 912. In some cases, biasing members may be positioned both above and below the battery 910. The biasing member 916 may be formed of or include an elastomeric or compliant material, such as a spring, foam, elastomer, or the like, to press on the battery 910. When the valve on the battery 910 is opened, the biasing member 916 may press on the battery to push gas out of the pouch (through the valve).

Figure 10:
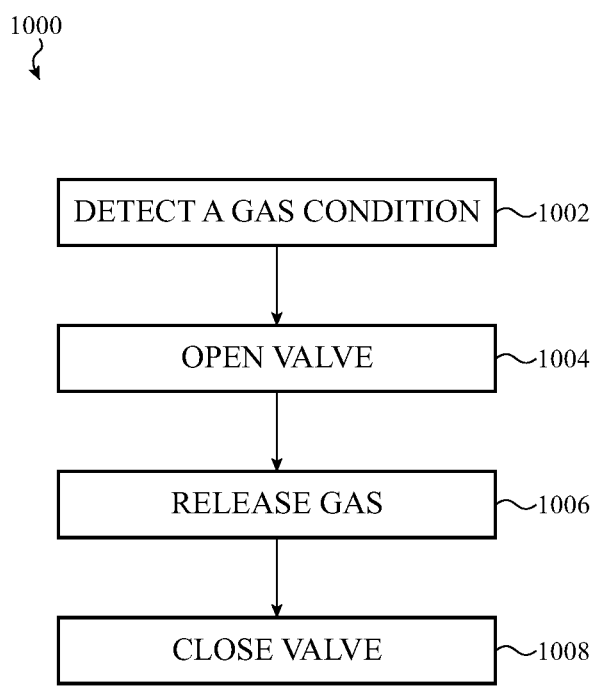
FIG. 10 depicts a method of drawing gas from a battery.

FIG. 10 illustrates an example process 1000 for releasing gas from a battery pouch using the systems described herein. At operation 1002, a gas condition is detected. The gas condition may be detected by a sensing system. The sensing system may include resistive sensors, piezoelectric and/or piezoresistive materials, transducers, or the like, as described herein. While a numerical value of the gas condition (e.g., a pascal or bar value) may be determined, in some implementations a numerical value may not be determined. For example, a sensing system may detect a predetermined amount of dynamic dimensional transformation of the battery pouch, thereby indicating that a gas condition within the battery pouch satisfies a criteria.

At operation 1004, a valve on the battery may be opened (e.g., corresponding to a first mode of operation). Opening the valve (e.g., the valve 502, FIG. 5A) may be achieved by sending a command or signal to the valve (e.g., by a processing system) that causes the valve to move from a closed position to an open position. The valve may be moved to the open position (e.g., commanded to open) in response to a determination that the gas condition satisfies criteria (which may be determined by detecting a dynamic dimensional transformation of a pouch that satisfies a criteria, such as a predetermined amount of dynamic dimensional transformation). In some cases, opening the valve may occur as a result of the action of a pump (e.g., as described with respect to FIGS. 8A-9B).

At operation 1006, gas may be released from the pouch. In some cases, once the battery valve is opened, the gas leaves the battery pouch without additional external influence on the battery. In other cases, releasing the gas may include actuating a pump mechanism to push the gas from the pouch (e.g., as described with respect to FIGS. 8A-9B).

At operation 1008, the valve on the battery may be closed (e.g., corresponding to a second mode of operation). Closing the valve (e.g., the valve 502, FIG. 5A) may be achieved by sending a command or signal to the valve (e.g., by a processing system) that causes the valve to move from an open position to a closed position. The valve may be moved to the closed position (e.g., commanded to close) in response to a determination that the gas condition fails to satisfy a criteria (e.g., it no longer satisfies the criteria). A determination that the gas condition fails to (or no longer) satisfies the criteria may include detecting a dynamic dimensional transformation that is below a predetermined amount). In some cases, closing the valve may occur as a result of the action of a pump (e.g., as described with respect to FIGS. 8A-9B).

Figure 11:
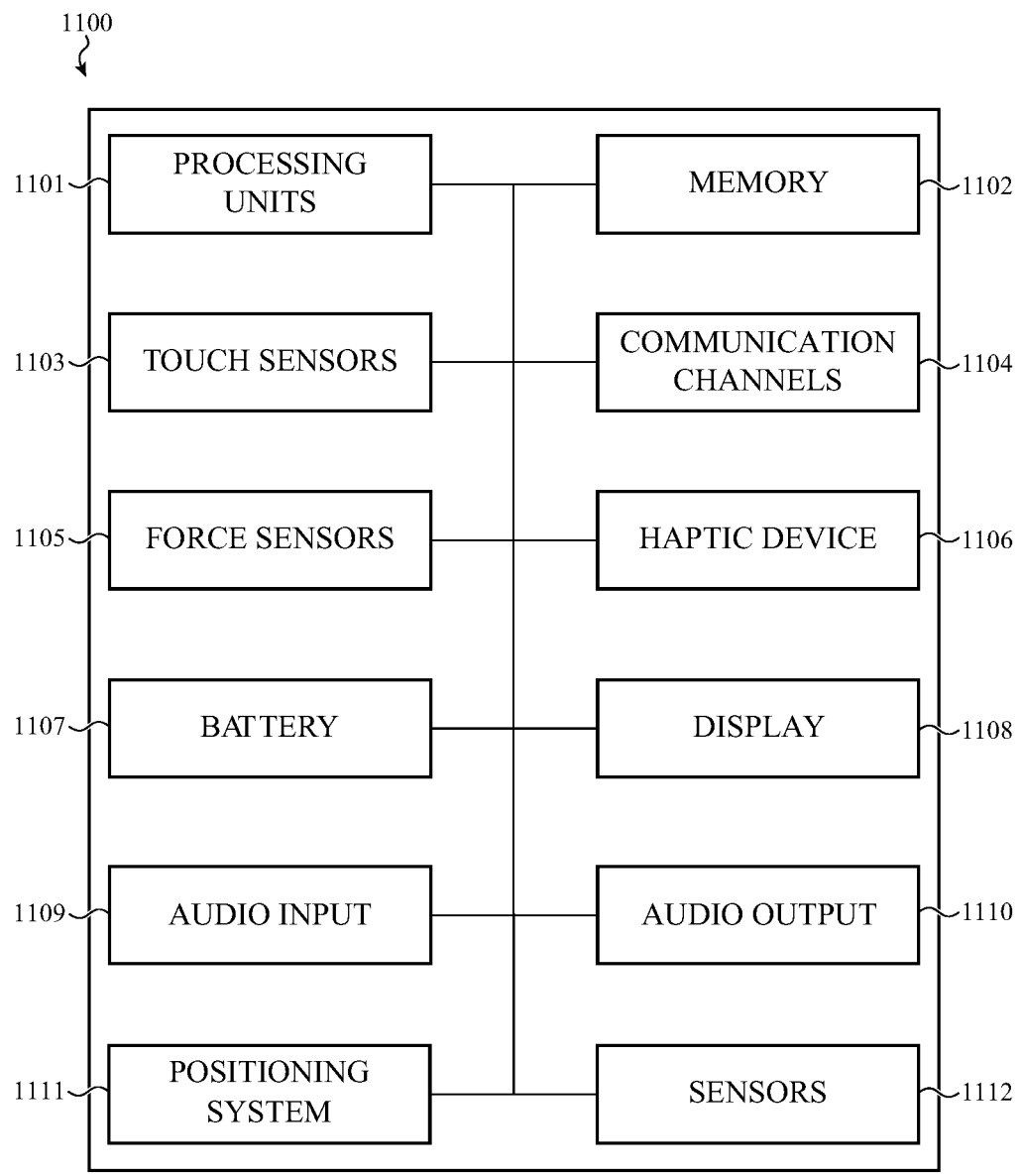
FIG. 11 depicts a schematic diagram of an example electronic device.

FIG. 11 depicts an example schematic diagram of an electronic device 1100. The electronic device 1100 may be an embodiment of or otherwise represent the device 100 (or other devices described herein). The electronic device 1100 may be a portable electronic device such as a mobile phone, tablet computer, laptop computer, wearable device (e.g., smartwatch, biometric sensor), or the like. The device 1100 includes one or more processing units 1101 that are configured to access a memory 1102 having instructions stored thereon. The instructions or computer programs may be configured to perform one or more of the operations or functions described with respect to the electronic devices described herein. For example, the instructions may be configured to control or coordinate the operation of one or more displays 1108, one or more touch sensors 1103, one or more force sensors 1105, one or more communication channels 1104, one or more audio input systems 1109, one or more audio output systems 1110, one or more positioning systems 1111, one or more sensors 1112, one or more gas release systems, and/or one or more haptic feedback devices 1106.

The processing units 1101 of FIG. 11 may be implemented as any electronic device capable of processing, receiving, or transmitting data or instructions. For example, the processing units 1101 may include one or more of: a microprocessor, a central processing unit (CPU), an application-specific integrated circuit (ASIC), a digital signal processor (DSP), or combinations of such devices. As described herein, the term "processor" or "processing system" is meant to encompass a single processor or processing unit, multiple processors, multiple processing units, or other suitably configured computing element or elements. The processing units 1101 may be coupled to a logic board.

The memory 1102 can store electronic data that can be used by the device 1100. For example, a memory can store electrical data or content such as, for example, audio and video files, images, documents and applications, device settings and user preferences, programs, instructions, timing and control signals or data for the various modules, data structures or databases, and so on. The memory 1102 can be configured as any type of memory. By way of example only, the memory can be implemented as random access memory, read-only memory, Flash memory, removable memory, or other types of storage elements, or combinations of such devices. The memory 1102 may be coupled to a logic board.

The touch sensors 1103 may detect various types of touch-based inputs and generate signals or data that are able to be accessed using processor instructions. The touch sensors 1103 may use any suitable components and may rely on any suitable phenomena to detect physical inputs. For example, the touch sensors 1103 may be capacitive touch sensors, resistive touch sensors, acoustic wave sensors, or the like. The touch sensors 1103 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The touch sensors 1103 may be integrated with or otherwise configured to detect touch inputs applied to any portion of the device 1100. For example, the touch sensors 1103 may be configured to detect touch inputs applied to any portion of the device 1100 that includes a display (and may be integrated with a display). The touch sensors 1103 may operate in conjunction with the force sensors 1105 to generate signals or data in response to touch inputs. A touch sensor or force sensor that is positioned over a display surface or otherwise integrated with a display may be referred to herein as a touch-sensitive display, force-sensitive display, or touchscreen.

The force sensors 1105 may detect various types of force-based inputs and generate signals or data that are able to be accessed using processor instructions. The force sensors 1105 may use any suitable components and may rely on any suitable phenomena to detect physical inputs. For example, the force sensors 1105 may be strain-based sensors, piezoelectric-based sensors, piezoresistive-based sensors, capacitive sensors, resistive sensors, or the like. The force sensors 1105 may include any suitable components for detecting force-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The force sensors 1105 may be used in conjunction with various input mechanisms to detect various types of inputs. For example, the force sensors 1105 may be used to detect presses or other force inputs that satisfy a force threshold (which may represent a more forceful input than is typical for a standard "touch" input) Like the touch sensors 1103, the force sensors 1105 may be integrated with or otherwise configured to detect force inputs applied to any portion of the device 1100. For example, the force sensors 1105 may be configured to detect force inputs applied to any portion of the device 1100 that includes a display (and may be integrated with a display). The force sensors 1105 may operate in conjunction with the touch sensors 1103 to generate signals or data in response to touch- and/or force-based inputs.

The device 1100 may also include one or more haptic devices 1106. The haptic device 1106 may include one or more of a variety of haptic technologies such as, but not necessarily limited to, rotational haptic devices, linear actuators, piezoelectric devices, vibration elements, and so on. In general, the haptic device 1106 may be configured to provide punctuated and distinct feedback to a user of the device. More particularly, the haptic device 1106 may be adapted to produce a knock or tap sensation and/or a vibration sensation. Such haptic outputs may be provided in response to detection of touch and/or force inputs, and may be imparted to a user through the exterior surface of the device 1100 (e.g., via a glass or other surface that acts as a touch- and/or force-sensitive display or surface).

The one or more communication channels 1104 may include one or more wireless interface(s) that are adapted to provide communication between the processing unit(s) 1101 and an external device. The one or more communication channels 1104 may include antennas (e.g., antennas that include or use the housing members of the housing 104 as radiating members), communications circuitry, firmware, software, or any other components or systems that facilitate wireless communications with other devices. In general, the one or more communication channels 1104 may be configured to transmit and receive data and/or signals that may be interpreted by instructions executed on the processing units 1101. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communication channels 1104 may also include ultra-wideband interfaces, which may include any appropriate communications circuitry, instructions, and number and position of suitable UWB antennas.

As shown in FIG. 11, the device 1100 may include a battery 1107 that is used to store and provide power to the other components of the device 1100. The battery 1107 may be a rechargeable power supply that is configured to provide power to the device 1100. The battery 1107 may be coupled to charging systems (e.g., wired and/or wireless charging systems) and/or other circuitry to control the electrical power provided to the battery 1107 and to control the electrical power provided from the battery 1107 to the device 1100. The battery 1107 may be an embodiment of or otherwise represent the battery 200 (or other batteries described herein).

The battery 1107 may include a gas release system, as described herein, to release gas from within the pouch of the battery. The gas release system may include one or more selectively actuatable valves (e.g., opening and closing in response to commands or signals from a processing system), and air-permeable waterproof membranes. The battery 1107 may also include or be associated with a sensing system that detects gas conditions within the battery 1107. For example, the sensing system may include resistive sensors, piezoelectric or piezoresistive materials, transducers, or other suitable materials, components, or systems that detect or facilitate detection of a gas condition in the battery 1107.

The device 1100 may also include one or more displays 1108 configured to display graphical outputs. The displays 1108 may use any suitable display technology, including liquid crystal displays (LCD), organic light emitting diodes (OLED), active-matrix organic light-emitting diode displays (AMOLED), or the like. The displays 1108 may display graphical user interfaces, images, icons, or any other suitable graphical outputs. The display 1108 may correspond to the display 103, FIG. 1A.

The device 1100 may also provide audio input functionality via one or more audio input systems 1109. The audio input systems 1109 may include microphones, transducers, or other devices that capture sound for voice calls, video calls, audio recordings, video recordings, voice commands, and the like.

The device 1100 may also provide audio output functionality via one or more audio output systems (e.g., speakers) 1110. The audio output systems 1110 may produce sound from voice calls, video calls, streaming or local audio content, streaming or local video content, or the like.

The device 1100 may also include a positioning system 1111. The positioning system 1111 may be configured to determine the location of the device 1100. For example, the positioning system 1111 may include magnetometers, gyroscopes, accelerometers, optical sensors, cameras, global positioning system (GPS) receivers, inertial positioning systems, or the like. The positioning system 1111 may be used to determine spatial parameters of the device 1100, such as the location of the device 1100 (e.g., geographical coordinates of the device), measurements or estimates of physical movement of the device 1100, an orientation of the device 1100, or the like.

The device 1100 may also include one or more additional sensors or sensing systems 1112 to receive inputs (e.g., from a user or another computer, device, system, network, etc.) or to detect any suitable property or parameter of the device, the environment surrounding the device, people or things interacting with the device (or nearby the device), or the like. For example, a device may include a sensing system that detects a gas condition within a battery enclosure. The sensing system may determine whether a gas condition in the battery enclosure satisfies a criteria, and, optionally in conjunction with the processing unit, may cause the valves of a gas release system to open to release the gas, and to close to reseal the pouch.

The device may also include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 11 are disclosed as being part of, incorporated into, or performed by the device 1100, it should be understood that various embodiments may omit any or all such described functionalities, operations, and structures. Thus, different embodiments of the device 1100 may have some, none, or all of the various capabilities, apparatuses, physical features, modes, and operating parameters discussed herein. Further, the systems included in the device 1100 are not exclusive, and the device 1100 may include alternative or additional systems, components, modules, programs, instructions, or the like, that may be necessary or useful to perform the functions described herein.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the

What is claimed is:

1. A portable electronic device comprising:
a housing;
a display at least partially within the housing;
a transparent cover over the display;
a battery at least partially within the housing and comprising:
   a battery cell;
   a pouch encasing the battery cell and comprising a plurality of layers, the pouch defining a hole extending through at least one layer of the plurality of layers; and
   a gas release system comprising:
      a gas-permeable membrane positioned at least partially within the hole and configured to prevent liquid from escaping the pouch, a peripheral portion of the gas-permeable membrane positioned between two layers of the plurality of layers; and
      a valve configured to selectively release gas from the pouch; a strain sensing system comprising a strain sensing element coupled to the pouch, the strain sensing system configured to detect a strain at a surface of the pouch, and
a processing system communicably coupled to the strain sensing system and configured to:
   in accordance with a determination that a strain at the surface of the pouch satisfies a criteria, cause the valve to open to allow gas to be released from the pouch; and
   in accordance with a determination that a strain at the surface of the pouch fails to satisfy the criteria, cause the valve to close.

2. The portable electronic device of claim 1, further comprising a mesh screen positioned over the gas-permeable membrane.

3. The portable electronic device of claim 1, wherein the plurality of layers comprises:
a first polymer layer defining an interior surface of the pouch;
a metallic layer over the first polymer layer;
an adhesive layer over the metallic layer; and
a second polymer layer over the adhesive layer and defining an exterior surface of the pouch.

4. The portable electronic device of claim 3, wherein:
the hole extends through the first polymer layer, the metallic layer, the adhesive layer, and the second polymer layer.

5. The portable electronic device of claim 3, wherein:
the valve is coupled to a flexible circuit substrate; and
the flexible circuit substrate is positioned between the metallic layer and the second polymer layer of the pouch.

6. The portable electronic device of claim 3, wherein the gas-permeable membrane is defined by a porous region of one or more of the plurality of layers of the pouch.

7. The portable electronic device of claim 1, wherein the strain sensing system includes a Wheatstone bridge.

8. A portable electronic device comprising:
a housing;
a display at least partially within the housing;
a transparent cover over the display;
a battery at least partially within the housing and comprising:
   a battery enclosure comprising a pouch, the pouch comprising:
      a first layer defining a hole; and
      a second layer comprising a polymer material and defining a porous region aligned with the hole;
   a battery cell within the battery enclosure; and
   a valve coupled to the battery enclosure and configured to selectively release gas from the battery enclosure through the hole;
a sensing system comprising a strain sensing element coupled to the battery enclosure, the sensing system configured to detect a strain at a surface of the battery enclosure correlated to a gas condition within the battery enclosure; and
a processing system communicably coupled to the sensing system and configured to selectively actuate the valve to release the gas from the battery enclosure based at least in part on a determination that a strain at the surface of the battery enclosure satisfies a criteria.

9. The portable electronic device of claim 8, wherein:
the valve is coupled to the pouch and positioned over the hole.

10. The portable electronic device of claim 8, wherein:
the first layer is a metallic layer;
the second layer is a first polymer material below the metallic layer and defining an interior surface of the pouch; and
the pouch further comprises:
   a second polymer material over the metallic layer and defining an exterior surface of the pouch.

11. The portable electronic device of claim 10, wherein:
the hole is a first hole; and
the second polymer material defines a second hole aligned with the first hole.

12. The portable electronic device of claim 11, wherein the porous region of the first polymer material is gas-permeable and waterproof.

13. The portable electronic device of claim 8, wherein the sensing system includes a Wheatstone bridge.

14. The portable electronic device of claim 8, wherein selectively actuating the valve comprises opening the valve if the strain satisfies the criteria.

15. A battery for a portable electronic device, comprising:
a battery cell;
a pouch formed of a flexible laminate and encasing the battery cell and defining a hole through at least one layer of a plurality of layers of the flexible laminate
a strain sensing element coupled to the pouch and configured to detect a strain at a surface of the pouch correlated to a gas condition within the pouch;
a gas-permeable waterproof membrane captured between two layers of the flexible laminate and extending across the hole in the pouch;
a valve covering the hole; and
a processing system communicably coupled to the strain sensing element and configured to:
   in accordance with a determination that a strain at the surface of the pouch satisfies a criteria, cause the valve to open to allow gas to be released from the pouch.

16. The battery of claim 15, wherein:
the valve is an electromechanical valve;
the flexible laminate comprises a flexible circuit substrate; and
the electromechanical valve is coupled to the flexible circuit substrate.

17. The battery of claim 15, further comprising a pump configured to assist a release of gas from within the pouch.

18. The battery of claim 15, wherein:
the valve is biased in a closed position.

19. The battery of claim 15, wherein the processing system is further configured to: in accordance with a determination that the strain at the surface of the pouch fails to satisfy the criteria, cause the valve to close.

20. The battery of claim 15, wherein the valve is caused to open by an electromagnetic force.

\* \* \* \* \*